(12) United States Patent
Kohli et al.

(10) Patent No.: US 8,539,036 B2
(45) Date of Patent: Sep. 17, 2013

(54) MODULAR TRANSPARENT PROXY CACHE

(75) Inventors: Jaspal Kohli, Sunnyvale, CA (US); Vikram Venkataraghavan, Santa Clara, CA (US); Junxiao He, Saratoga, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 262 days.

(21) Appl. No.: 13/051,325

(22) Filed: Mar. 18, 2011

(65) Prior Publication Data
US 2012/0239811 A1    Sep. 20, 2012

(51) Int. Cl.
*G06F 15/167* (2006.01)
(52) U.S. Cl.
USPC ........................................... 709/213
(58) Field of Classification Search
USPC .......................... 709/224–226, 213
See application file for complete search history.

(56) References Cited

U.S. PATENT DOCUMENTS

| | | | |
|---|---|---|---|
| 7,080,158 B1 | 7/2006 | Squire | |
| 7,139,811 B2 * | 11/2006 | Lev Ran et al. | 709/226 |
| 2006/0117093 A1 | 6/2006 | Aviani, Jr. et al. | |
| 2010/0162126 A1 * | 6/2010 | Donaldson et al. | 715/738 |
| 2011/0078309 A1 * | 3/2011 | Bloch et al. | 709/224 |
| 2011/0219120 A1 * | 9/2011 | Farber et al. | 709/226 |
| 2012/0116896 A1 * | 5/2012 | Holloway et al. | 705/14.73 |

OTHER PUBLICATIONS

European Search Report corresponding to EP 11 19 0566 mailed Feb. 6, 2012, 8 pages.

* cited by examiner

*Primary Examiner* — Benjamin R Bruckart
*Assistant Examiner* — Normin Abedin
(74) *Attorney, Agent, or Firm* — Harrity & Harrity, LLP

(57) ABSTRACT

A device receives, from a client device, a request for a resource that is available from an origin device, and determines whether the resource is cached in a cache server or not cached in the cache server. The device forwards the request to the cache server regardless of whether or not the resource is cached in the cache server, and receives, when the resource is not cached in the cache server, a redirect command from the cache server based on the request. The device forwards the received redirect command to the client device, where the redirect command instructs the client device to obtain the resource from the origin device. The device receives, from the cache server and based on the request, the resource when the resource is cached in the cache server, and forwards the received resource to the client device.

25 Claims, 17 Drawing Sheets

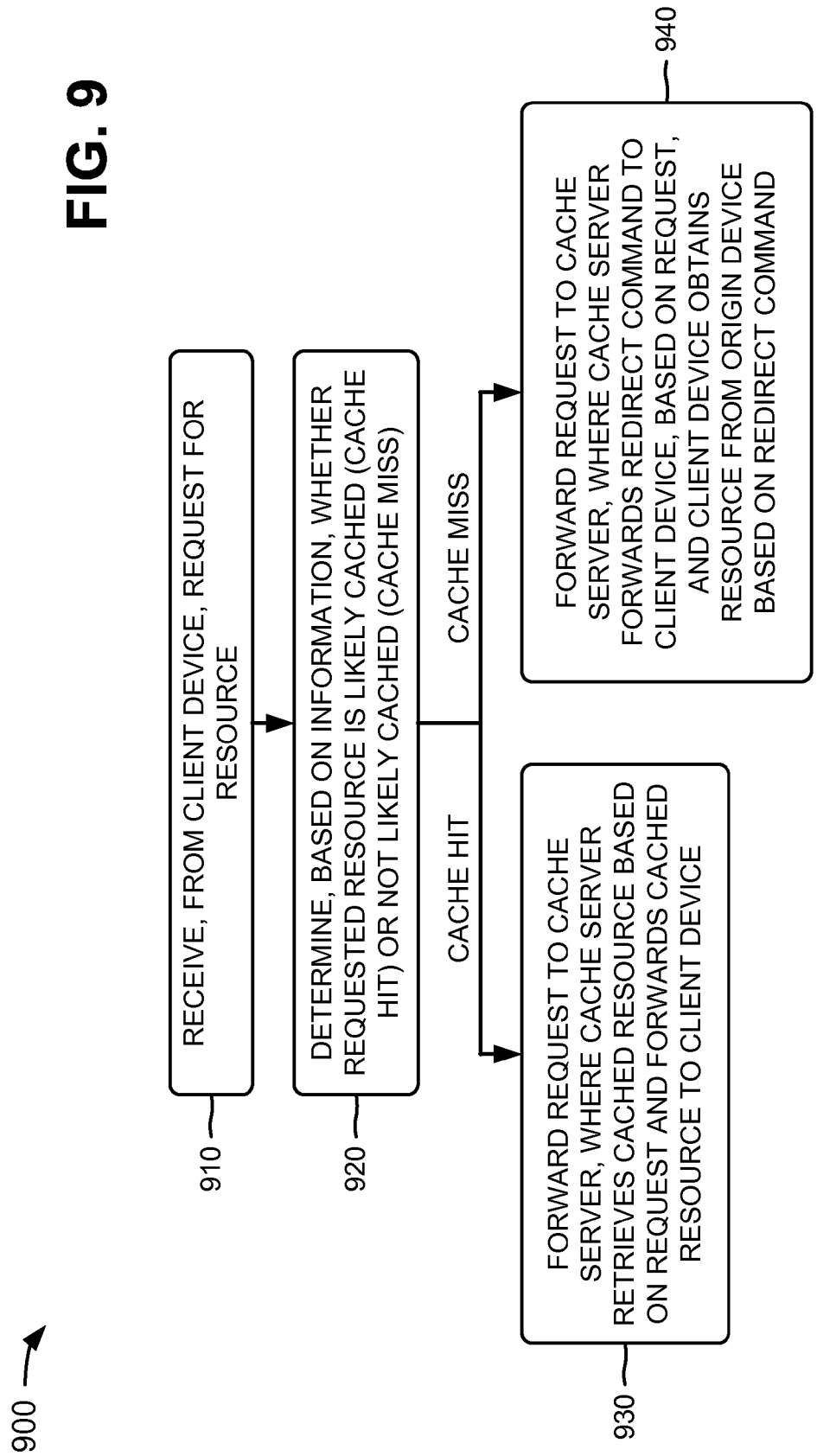

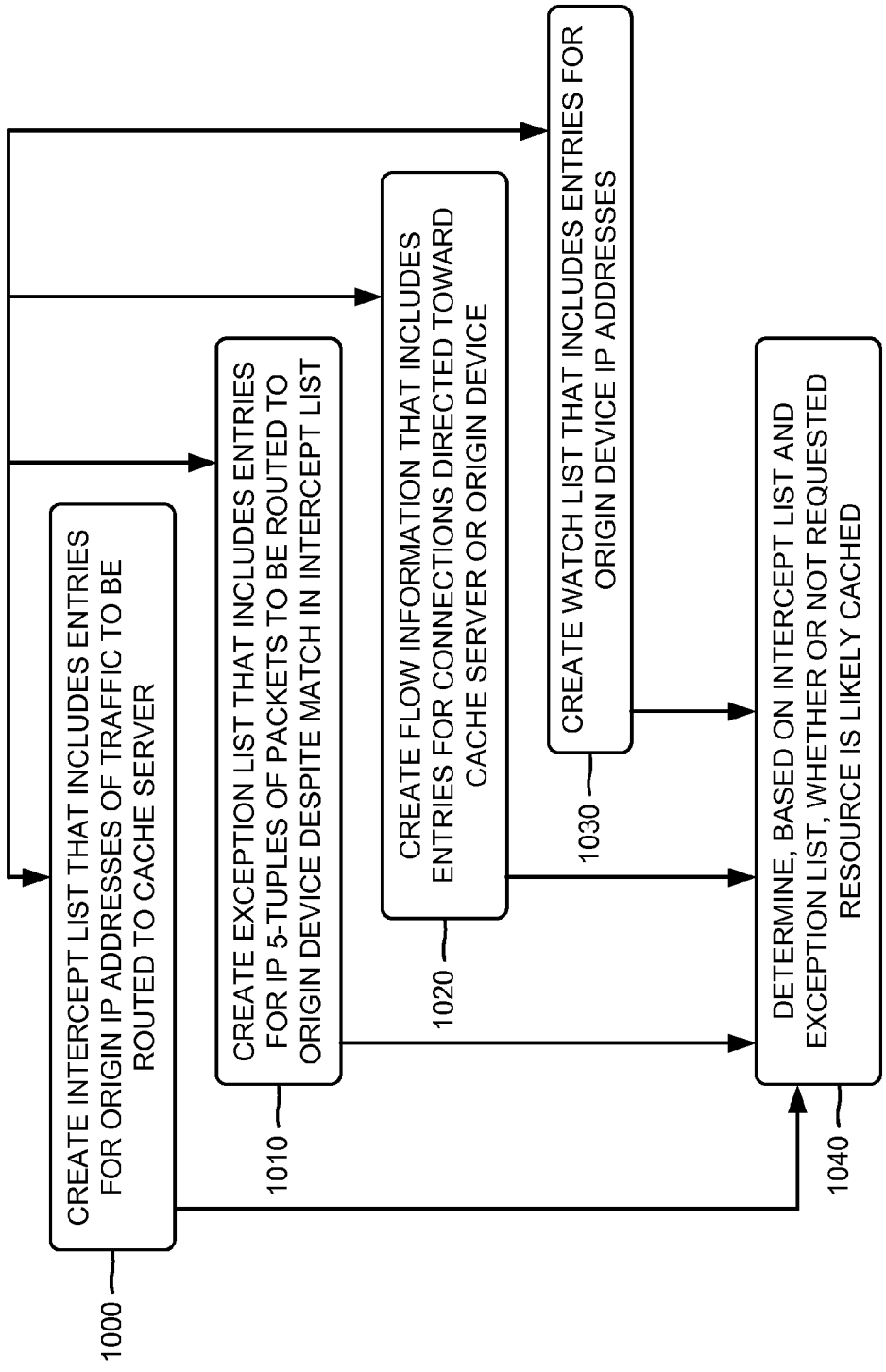

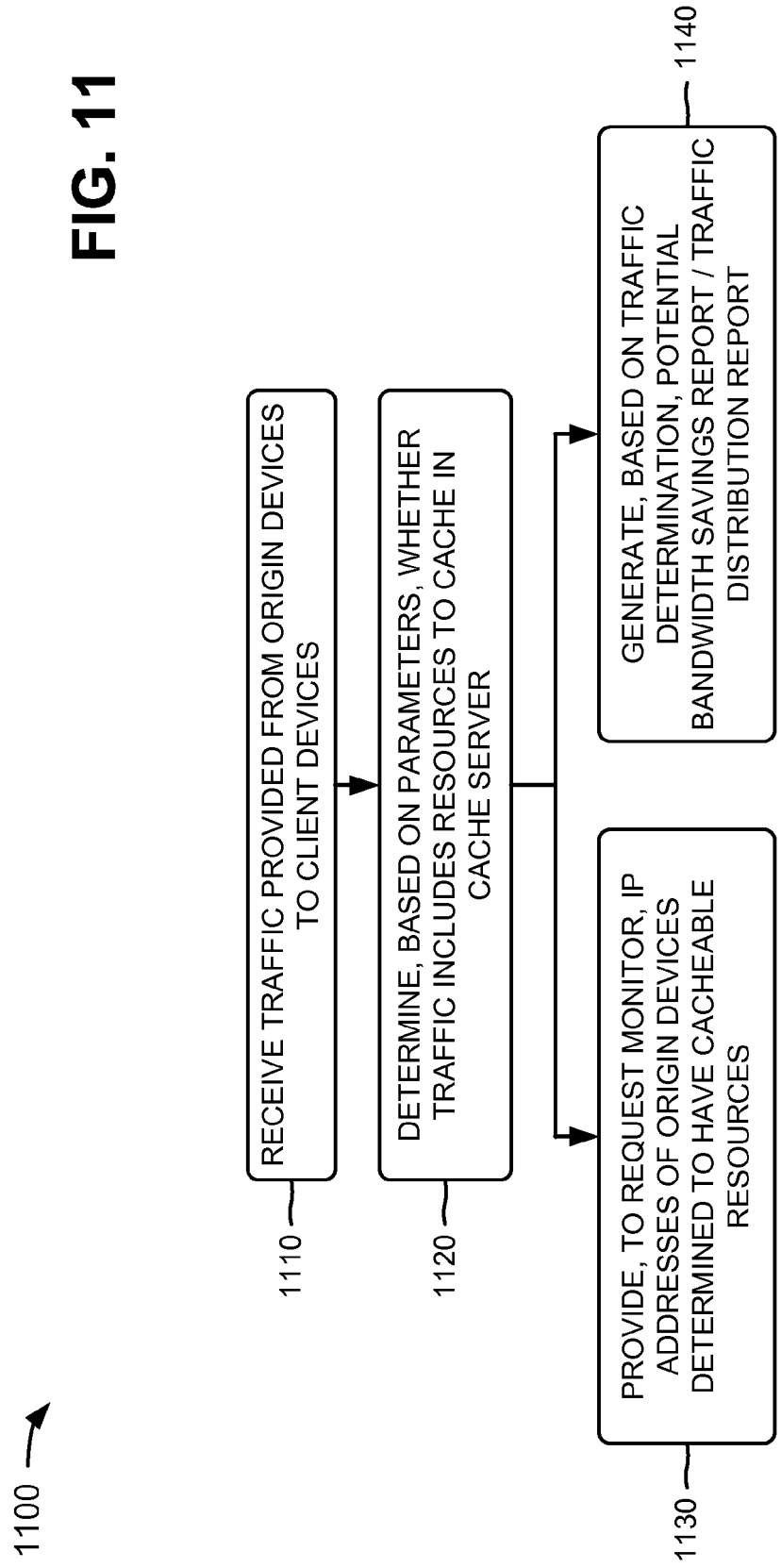

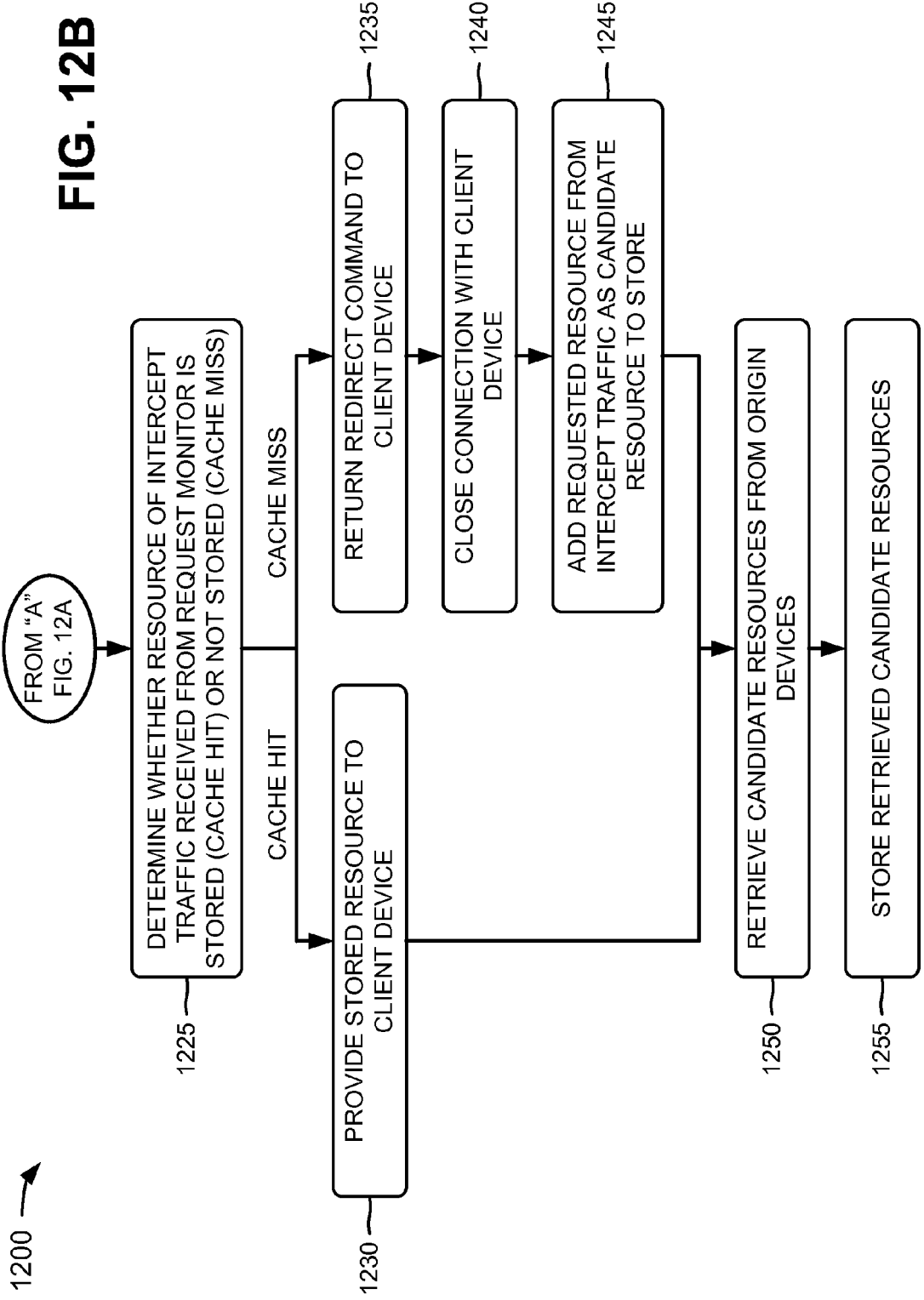

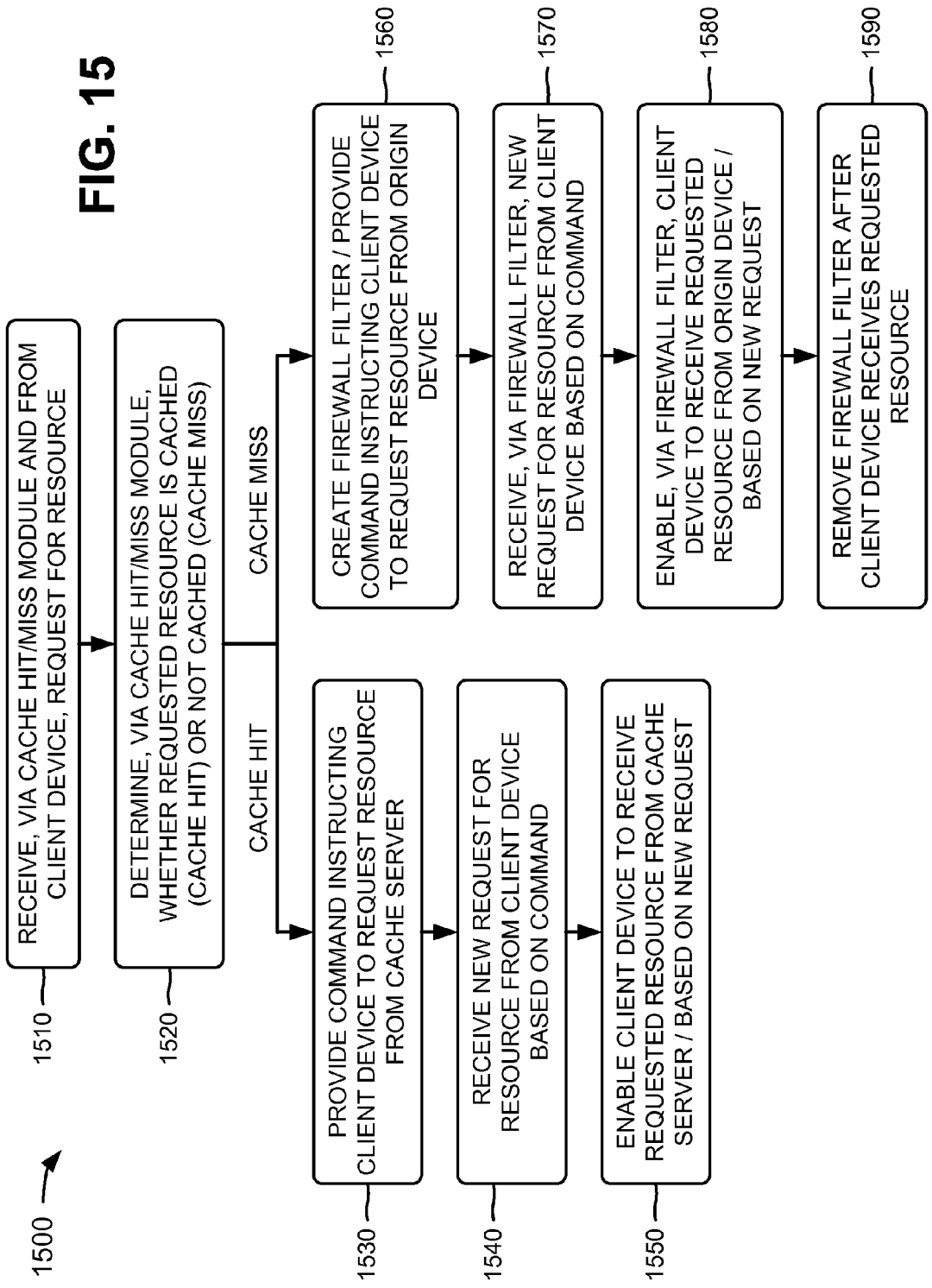

MODULAR TRANSPARENT PROXY CACHE

BACKGROUND

A service provider is an entity (e.g., a business or an organization) that sells bandwidth provided by or access to a network (e.g., the Internet, a data network, a telecommunication network, etc.) associated with the service provider. Service providers may include telecommunications companies, data carriers, wireless communications providers, Internet service providers, cable television operators offering high-speed Internet access, etc. The rapid growth in the use of content, such as, for example, video, audio, images, software downloads, is creating much higher bandwidth demands on service providers, with sharp peaks around viral content and events.

In order to address such higher bandwidth demands, service providers deploy transparent hypertext transfer protocol (HTTP) proxy cache devices, such as, cache servers, in their networks. The proxy cache devices (also referred to herein as "proxy caches") can cache popular content, which enables the service providers to optimize network utilization and to save on the backhaul bandwidth costs. Proxy caches are typically implemented at Layer 7, which is the application layer of the Open Systems Interconnection (OSI) model. The proxy caches may be associated with network devices (e.g., routers) that interconnect client devices requesting content and origin devices storing the requested content. A proxy cache is "transparent" to a client device and an origin device because the proxy cache uses the origin device's address (e.g., Internet protocol (IP) address) to send information (e.g., packets) to the client device and uses the client device's IP address to send information to the origin device. Such an arrangement ensures that the proxy cache is not visible to either the client device or the origin device.

A network device interconnecting a client device exchanging traffic with an origin device may utilize a filter or policy-based routing (PBR) to send a subset of the traffic, such as a request for content, from the network device to the proxy cache. In such an arrangement, the proxy cache will terminate a connection (e.g., a transmission control protocol (TCP) connection) with the client device. If the request is for content that is stored in the proxy cache, then the proxy cache provides the content to the client device using an IP address of the origin device. If the requested content is not stored in the proxy cache, then the proxy cache connects to the origin device using an IP address of the client device and requests the content from the origin device. The proxy cache provides the content returned by the origin device to the client device, using the IP address of the origin device, and may cache the content for future use.

However, proxy caches deployed in such a manner experience problems associated with asymmetric routing and packet processing overhead. Asymmetric routing occurs in many service providers networks when a packet traverses from a client device to an origin device in one path, and a response packet traverses from the origin device to the client device in a different path. In certain instances, the response packet may bypass the proxy cache and go straight to the client device. The response packet will get dropped by the client device since the response packet does not match any connection state and will result in a timeout at the proxy cache.

In proxy cache deployments, cache hit ratios (e.g., a probability that the proxy cache stores content requested by a client device) are typically low (e.g., less than 20%) because client devices access a wide variety of content and sizeable portion of such content is non-cacheable (e.g., dynamic data). Despite the low cache hit ratios, all client device requests flow through the proxy cache and unnecessarily increase packet processing overhead in the proxy cache.

SUMMARY

According to one aspect, a method may be performed by a computing device. The method may include: receiving, by the computing device and from a client device, a request for a resource that is available from an origin device; determining, based on information stored in a memory associated with the computing device, whether the resource is likely cached in a cache server or not likely cached in the cache server; forwarding, by the computing device, the request to the cache server when the resource is likely cached in the cache server, where the cache server retrieves a cached resource based on the request and forwards the cached resource to the client device; and forwarding, by the computing device, the request to the cache server when the resource is not likely cached in the cache server, where the cache server forwards a redirect command to the client device, based on the request, and where the client device obtains the resource from the origin device based on the redirect command.

According to another aspect, a computing device may include a memory to store information regarding resources stored in a cache server, and a processor. The processor may receive, from a client device, a request for a resource that is available from an origin device, and may determine, based on the information stored in the memory, whether the resource is likely cached in a cache server or not likely cached in the cache server. When the resource is likely cached in the cache server, the processor may forward the request to the cache server, where the cache server retrieves a cached resource based on the request and forwards the cached resource to the client device. When the resource is not likely cached in the cache server, the processor may forward the request to the cache server, where the cache server forwards a redirect command to the client device, based on the request, and where the client device obtains the resource from the origin device based on the redirect command.

According to still another aspect, a method may be performed by a cache server device. The method may include: receiving, by the cache server device and from the request monitor device, requests for resources that match entries of a watch list that include addresses of origin devices with cacheable resources; adding, by the cache server device, the requested resources as candidate resources to store; retrieving, by the cache server device, the candidate resources from one or more of the origin devices; and storing, by the cache server device, the retrieved candidate resources, where the retrieved candidate resources may be served directly by the cache server device rather than by the one or more of the origin devices.

According to a further aspect, one or more non-transitory computer-readable media may store instructions executable by one or more processors of a cache server device. The media may include: one or more instructions to receive, from the request monitor device, requests for resources that match entries of a watch list that includes address of origin devices with cacheable resources; one or more instructions to add the requested resources as candidate resources to store; one or more instructions to retrieve the candidate resources from one or more of the origin devices; and one or more instructions to store the retrieved candidate resources, where the retrieved candidate resources may be served directly by the cache server device rather than by the one or more of the origin devices.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIGS. 9 and 10 are flow charts of an example process for providing request monitoring functionality for a proxy cache scheme according to an implementation described herein;

FIG. 11 is a flow chart of an example process for providing response monitoring functionality for a proxy cache scheme according to an implementation described herein;

FIGS. 12A and 12B depict a flow chart of an example process for providing a modular transparent proxy cache according to an implementation described herein;

FIG. 15 is a flow chart of an example process for optimizing content flow in a proxy cache scheme according to an implementation described herein.

DETAILED DESCRIPTION

Figure 1:
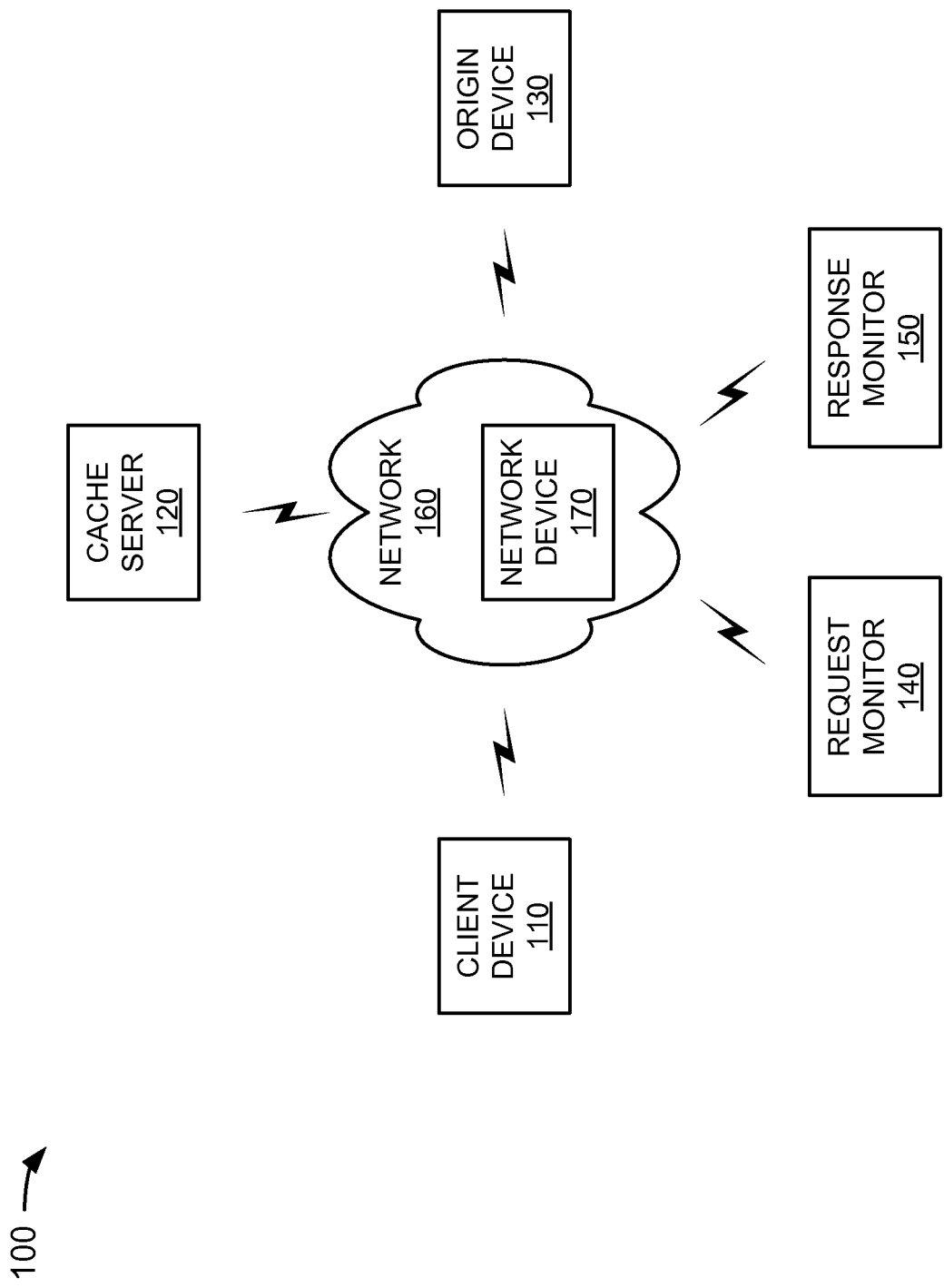
FIG. 1 is a diagram of an example network in which systems and/or methods described herein may be implemented.

The following detailed description refers to the accompanying drawings. The same reference numbers in different drawings may identify the same or similar elements.

Systems and/or methods described herein may provide a modular transparent proxy cache scheme that separates cache hits and cache misses, where a cache hit may refer to when a requested resource is stored in a proxy cache, such as a cache server, and a cache miss may refer to when a requested resource is not stored in the cache server. The systems and/or methods may enable cache hit traffic to be served by the cache server using an IP address of an origin device storing a resource, and may enable cache miss traffic to flow between a client device (e.g. requesting a resource) and the origin device without any Layer 7 intercept. The cache server may asynchronously retrieve and store resources, such as content, services, etc., using a set of configured IP addresses associated with origin devices. In one example, when a cache miss occurs, the systems and/or methods may cause a redirect command to be provided back to a client device requesting a resource. In response to the redirect command, the client device may generate a new resource request that may be provided to an origin device without intervention of the cache server.

In an example implementation, the systems and/or methods may receive, from a client device, a request for a resource that is available from an origin device, and may determine whether the requested resource is likely cached (e.g., a cache hit) or not likely cached (e.g., a cache miss) in a cache server. When the requested resource is likely cached in the cache server, the systems and/or methods may forward the request to the cache server. The cache server may retrieve a cached resource based on the request, and may forward the cached resource to the client device. When the requested resource is not likely cached in the cache server, the systems and/or methods may forward the request to the cache server, and the cache server may forward a redirect command to the client device, based on the request. The redirect command may cause the client device to obtain the resource from the origin device.

In another example implementation, the systems and/or methods may receive, from a client device, a request for a resource, and may determine whether the requested resource is cached (e.g., a cache hit) or not cached (e.g., a cache miss) in a cache server. If a cache hit occurs, the systems and/or methods may provide a command instructing the client device to request the resource from the cache server, and may receive, from the client device, a new request for the resource based on the command. The systems and/or methods may enable the client device to receive the requested resource from the cache server based on the new request. If a cache miss occurs, the systems and/or methods may create a firewall filter, and may provide a command instructing the client device to request the resource from an origin device. The systems and/or methods may receive, via the firewall filter and from the client device, a new request for the resource based on the command, and may enable, via the firewall filter, the client device to receive the requested resource from the origin device based on the new request. The systems and/or methods may remove the firewall filter after the client device receives the requested resource.

FIG. 1 is a diagram of an example network 100 in which systems and/or methods described herein may be implemented. As illustrated, network 100 may include a client device 110; a cache server device 120 (referred to herein as "cache server 120"); an origin device 130, a request monitor device 140 (referred to herein as "request monitor 140"); a response monitor device 150 (referred to herein as "response monitor 150"); a network 160; and a network device 170 provided in or attached to network 160. Devices of network 100 may interconnect via wired and/or wireless connections or links. A single client device 110, cache server 120, origin device 130, request monitor 140, response monitor 150, network 160, and network device 170 have been illustrated in FIG. 1 for simplicity. In practice, there may be more client devices 110, cache servers 120, origin devices 130, request monitors 140, response monitors 150, networks 160, and/or network devices 170. Also, in some instances, one or more of the devices of network 100 may perform one or more tasks described as being performed by another one or more of the devices of network 100.

Client device 110 may include any device that is capable of accessing cache server 120 and/or origin device 130 via network 160 and/or network device 170. For example, client device 110 may include a radiotelephone, a personal communications system (PCS) terminal that may combine a cellular radiotelephone with data processing and data communications capabilities, a personal digital assistant (PDA) that can include a radiotelephone, a pager, Internet/intranet access, etc., a wireless device (e.g., a wireless telephone), a smart phone, a workstation computer, a laptop computer, a personal computer, or other types of computation or communication devices.

Cache server 120 may include one or more server devices, or other types of computation or communication devices, that gather, process, search, and/or provide information in a manner described herein. In one example implementation, cache server 120 may act as an intermediary for requests from client device 110 seeking resources from origin device 130. The term resources, as used herein, is intended to be broadly construed to include content, such as video, audio, images, software downloads, etc.; services, such as delivering high-definition and user-generated content, consumer and business news and information services, an email system, etc.; and/or a combination of content and services. Client device 110 may connect to cache server 120, and may request some resource available from origin device 130. Cache server 120 may evaluate the request (e.g., according to filtering rules, such as filtering traffic by IP address or protocol). If the request is validated, cache server 120 may provide the requested resource by connecting to origin device 130 and requesting the resource on behalf of client device 110. Cache server 120 may alter the request from client device 110 and/or may alter the response from origin device 130. Cache server 120 may serve the request without contacting origin device 130. In this case, cache server 120 may cache (or store) a particular resource previously requested from origin device 130, and may provide the particular resource to client device 110 without involving origin device 130.

Origin device 130 may include one or more server devices, or other types of computation or communication devices, that gather, process, search, and/or provide resources in a manner described herein. In one example implementation, origin device 130 may include resources that may be accessed by client device 110 via network 160 and/or network device 170. In one example, origin device 130 may provide resources to client device 110 (e.g., via network 160 and/or network device 170). Alternatively, origin device 130 may provide particular resources to cache server 120 for storage. Cache server 120 may store the particular resources so that cache server 120 may provide the particular resources to client device 110, when requested by client device 110, and without involving origin device 130.

Request monitor 140 may include one or more server devices, or other types of computation or communication devices, that gather, process, search, and/or provide information in a manner described herein. In one example implementation, request monitor 140 may segregate cache hit traffic, such as requests for resources stored in cache server 120, and cache miss traffic, such as requests for resources not stored in cache server 120, at a TCP/IP level. Request monitor 140 may perform this segregation based on information, stored in a memory, that is dynamically updated using an observed traffic flow (e.g., of traffic provided via network 160 and/or network device 170) and a control protocol.

In one example implementation, request monitor 140 may receive, from client device 110, a request for a resource that is available from origin device 130, may determine whether the requested resource is likely cached (e.g., a cache hit) or not likely cached (e.g., a cache miss) in cache server 120. If the requested resource is likely cached in cache server 120, request monitor 140 may forward the request to cache server 120. Cache server 120 may retrieve a cached resource based on the request, and may forward the cached resource to client device 110. If the requested resource is not likely cached in cache server 120, request monitor 140 may forward the request to cache server 120, and cache server 120 may forward a redirect command to client device 110, based on the request. The redirect command may cause client device 110 to obtain the resource from origin device 130.

Response monitor 150 may include one or more server devices, or other types of computation or communication devices, that gather, process, search, and/or provide information in a manner described herein. In one example implementation, response monitor 150 may monitor traffic (e.g., response flows) provided from origin devices (e.g., origin device 130) to client devices (e.g., client device 110), and may determine, based on a set of configurable parameters, such as object size, cache expiry time, total cacheable bandwidth, etc., whether the traffic includes resources that may be stored in cache server 120. Response monitor 150 may provide, to request monitor 140, addresses (e.g., IP addresses) of origin devices with the cacheable resources. Response monitor 150 may generate reports based on the received traffic. For example, response monitor 150 may generate a report that describes potential bandwidth savings provided by cache server 120, a report that describes distribution of traffic based on various parameters, such as an origin device IP address, a multipurpose Internet mail extensions (MIME) type, a MIME size, etc., and/or other similar reports.

Network 160 may include a service provider network, such as a local area network (LAN); a wide area network (WAN); a metropolitan area network (MAN); a telephone network (e.g., the Public Switched Telephone Network (PSTN) or a cell network); the Internet; or a combination of networks.

Network device 170 may include a traffic transfer device, such as a gateway, a router, a switch, a firewall, a network interface card (NIC), a hub, a bridge, a proxy server, an optical add-drop multiplexer (OADM), or some other type of device that processes and/or transfers traffic (e.g., packets). In one example, network device 170 may enable client device 110, cache server 120, origin device 130, request monitor 140, and/or response monitor 150 to communicate with one another. In another example, network device 170 may enable client device 110 to request and receive resources from cache server 120 and/or origin device 130.

Although FIG. 1 shows example devices of network 100, in other implementations, network 100 may include fewer devices, different devices, differently arranged devices, or additional devices than depicted in FIG. 1.

Figure 2:
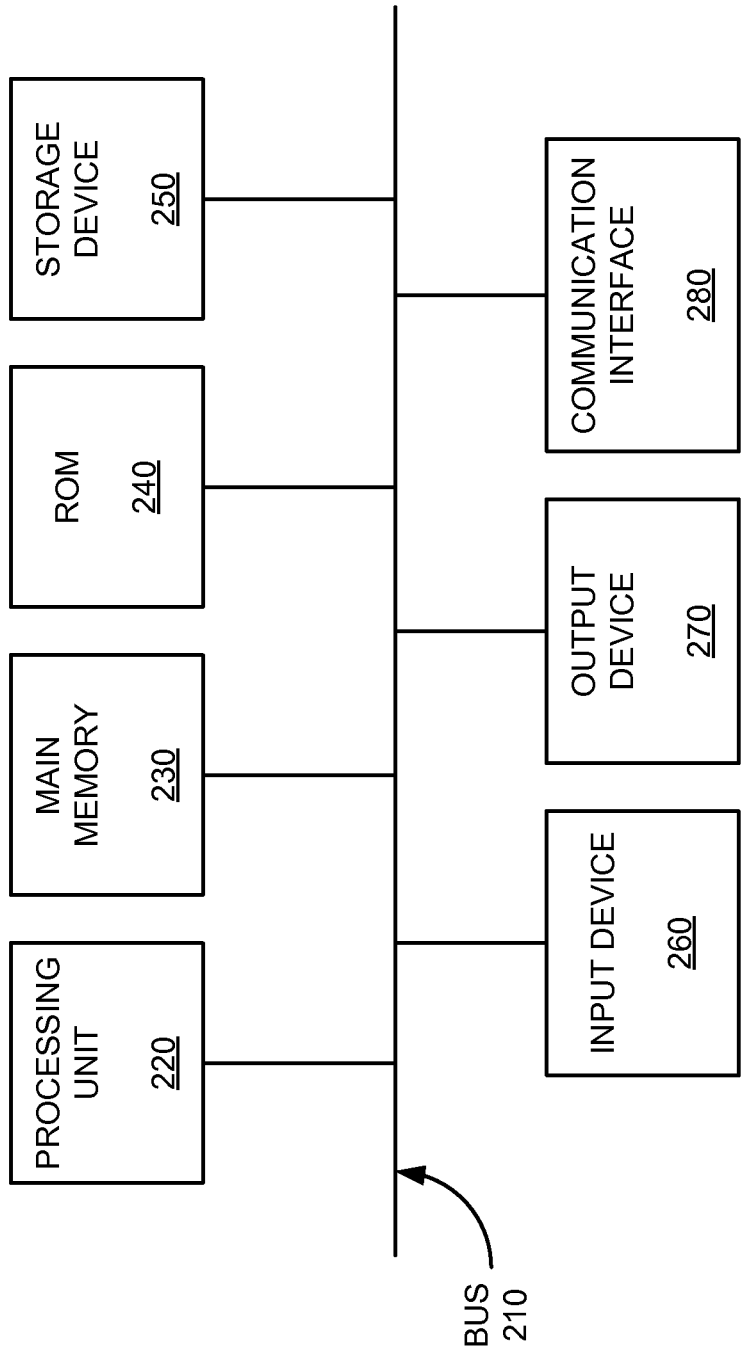
FIG. 2 is a diagram of example components of a client device, a cache server, or an origin device depicted in FIG. 1.

FIG. 2 is a diagram of example components of a device 200 that may correspond to client device 110, cache server 120, or origin device 130 (FIG. 1). In some instances, device 200 may correspond to request monitor 140 and/or response monitor 150 (FIG. 1). In other instances, client device 110, cache server 120, origin device 130, request monitor 140, or response monitor 150 may include one or more devices 200. As illustrated in FIG. 2, device 200 may include a bus 210, a processing unit 220, a main memory 230, a read only memory (ROM) 240, a storage device 250, an input device 260, an output device 270, and/or a communication interface 280. Bus 210 may include a path that permits communication among the components of device 200.

Processing unit 220 may include one or more processors, microprocessors, application-specific integrated circuit (ASICs), field-programmable gate arrays (FPGAs), or other types of processing units that interpret and execute instructions. Main memory 230 may include a random access memory (RAM) or another type of dynamic storage device that stores information and instructions for execution by processing unit 220. ROM 240 may include a ROM device or another type of static storage device that stores static information and/or instructions for use by processing unit 220. Storage device 250 may include a magnetic and/or optical recording medium and its corresponding drive, or a removable memory, such as a flash memory.

Input device 260 may include a mechanism that permits an operator to input information to device 200, such as a keyboard, a mouse, a switch, a button, voice recognition and/or biometric mechanisms, a touch screen, etc. Output device 270 may include a mechanism that outputs information to the operator, including a display, a speaker, a light emitting diode (LED), etc. Communication interface 280 may include any transceiver-like mechanism that enables device 200 to communicate with other devices and/or systems. For example, communication interface 280 may include mechanisms for communicating with another device or system via a network. In one implementation, communication interface 280 may include a wired interface, such as an Ethernet interface, or a wireless interface, such as radio frequency interface.

As described herein, device 200 may perform certain operations in response to processing unit 220 executing software instructions contained in a computer-readable medium, such as main memory 230. A computer-readable medium may be defined as a non-transitory memory device. A memory device may include space within a single physical memory device or spread across multiple physical memory devices. The software instructions may be read into main memory 230 from another computer-readable medium, such as storage device 250, or from another device via communication interface 280. The software instructions contained in main memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more other tasks described as being performed by one or more other components of device 200.

Figure 3:
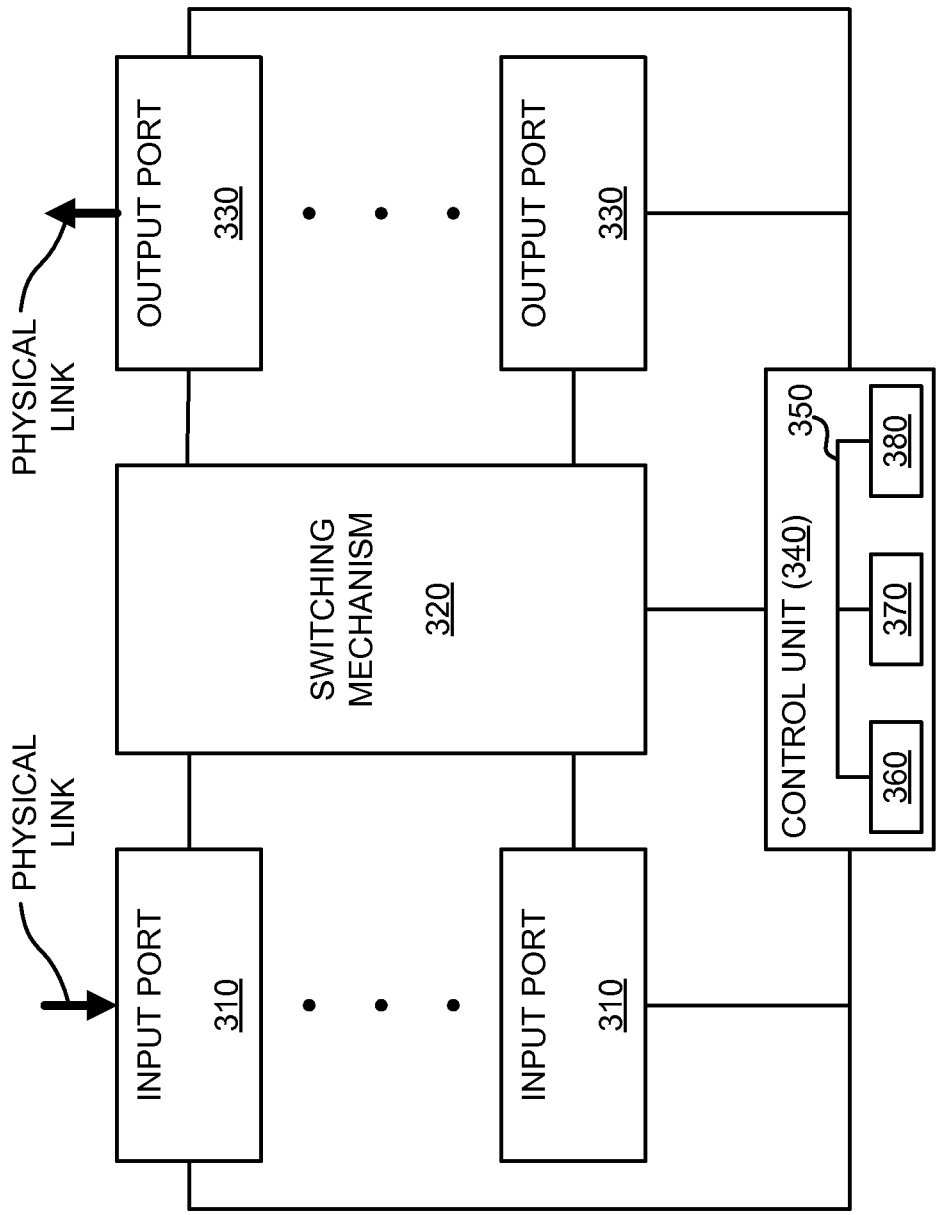
FIG. 3 is a diagram of example components of a request monitor, a response monitor, or a network device depicted in FIG. 1.

FIG. 3 is a diagram of example components of a device 300 that may correspond to request monitor 140, response monitor 150, or network device 170 (FIG. 1). In some instances, request monitor 140, response monitor 150, or network device 170 may include one or more devices 300. As shown in FIG. 3, device 300 may include input ports 310, a switching mechanism 320, output ports 330, and a control unit 340.

Input ports 310 may be a point of attachment for physical links and may be a point of entry for incoming traffic, such as packets. Input ports 310 may carry out data link layer encapsulation and decapsulation. In an example implementation, input ports 310 may send and/or receive packets.

Switching mechanism 320 may interconnect input ports 310 with output ports 330. Switching mechanism 320 may be implemented using many different techniques. For example, switching mechanism 320 may be implemented via busses, crossbars, and/or with shared memories which may act as temporary buffers to store traffic from input ports 310 before the traffic is eventually scheduled for delivery to output ports 330.

Output ports 330 may store packets and may schedule packets for service on output physical links. Output ports 330 may include scheduling algorithms that support priorities and guarantees. Output ports 330 may support data link layer encapsulation and decapsulation, and/or a variety of higher-level protocols. In an example implementation, output ports 330 may send packets and/or receive packets.

Control unit 340 may use routing protocols and one or more forwarding tables for forwarding packets. Control unit 340 may connect with input ports 310, switching mechanism 320, and output ports 330. Control unit 340 may compute a forwarding table, implement routing protocols, and/or run software to configure and manage device 300. Control unit 340 may handle any packet whose destination address may not be found in the forwarding table.

In an example implementation, control unit 340 may include a bus 350 that may include a path that permits communication among a processor 360, a memory 370, and a communication interface 380. Processor 360 may include one or more processors, microprocessors, ASICs, FPGAs, or other types of processing units that may interpret and execute instructions. Memory 370 may include a RAM, a ROM device, a magnetic and/or optical recording medium and its corresponding drive, and/or another type of static and/or dynamic storage device that may store information and instructions for execution by processor 360. Memory 370 may also temporarily store incoming traffic (e.g., a header of a packet or an entire packet) from input ports 310, for processing by processor 360, before a packet is directed back to switching mechanism 320, queued in switching mechanism 320, and eventually scheduled to be sent to output ports 330. Communication interface 380 may include any transceiver-like mechanism that enables control unit 340 to communicate with other devices and/or systems.

Device 300 may perform certain operations, as described herein. Device 300 may perform these operations in response to processor 360 executing software instructions contained in a computer-readable medium, such as memory 370. The software instructions may be read into memory 370 from another computer-readable medium, such as a data storage device, or from another device via communication interface 380. The software instructions contained in memory 370 may cause processor 360 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in other implementations, device 300 may include fewer components, different components, differently arranged components, or additional components than depicted in FIG. 3. Alternatively, or additionally, one or more components of device 300 may perform one or more other tasks described as being performed by one or more other components of device 300.

Figure 4A:
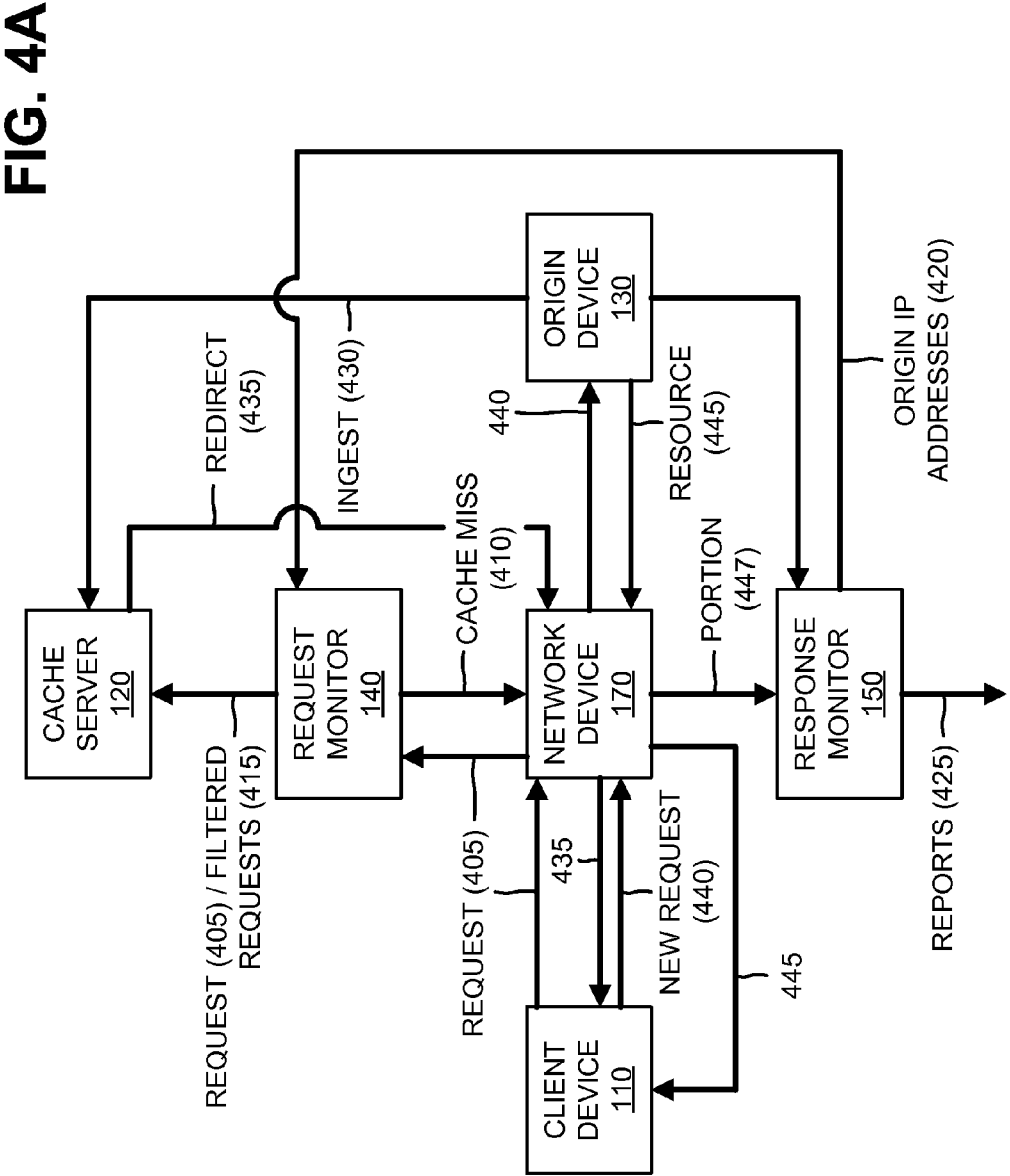
FIGS. 4A and 4B are diagrams of example operations capable of being performed by an example portion of the network illustrated in FIG. 1.
Figure 4B:
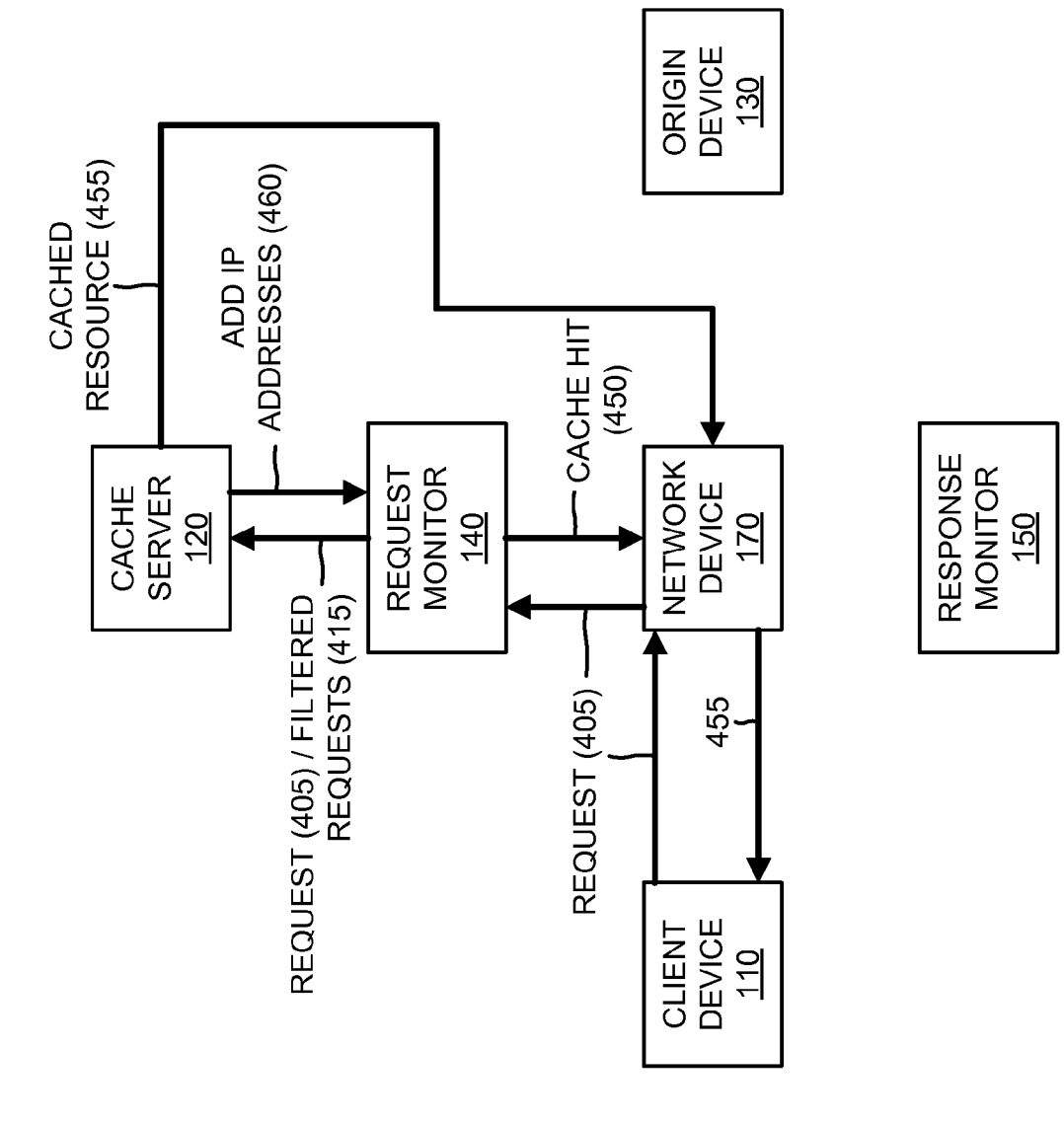

FIGS. 4A and 4B are diagrams of example operations capable of being performed by an example portion 400 of network 100. As shown in FIGS. 4A and 4B, example network portion 400 may include client device 110, cache server 120, origin device 130, request monitor 140, response monitor 150, and network device 170. Client device 110, cache server 120, origin device 130, request monitor 140, response monitor 150, and network device 170 may include the features described above in connection with, for example, one or more of FIGS. 1-3.

As shown in FIG. 4A, client device 110 may provide a request 405 for a resource to network device 170, and network device 170 may provide request 405 to request monitor 140. Request monitor 140 may receive request 405, and may determine, based on information (e.g., provided in request monitor 140 and described below in connection with FIG. 6), whether the resource requested by request 405 is likely cached (e.g., a cache hit) in cache server 120 or not likely cached (e.g., a cache miss) in cache server 120. For the operations depicted in FIG. 4A, it is assumed that the requested resource is not cached in cache server 120. Thus, request monitor 140 may provide an indication 410 of a cache miss to network device 170.

Although not shown in FIG. 4A, request monitor 140 may receive additional resource requests from client device 110 or other client devices (e.g., via network device 170 or other network devices), and may filter the additional resource requests (e.g., including request 405) to generate filtered requests 415. In one example implementation, request monitor 140 may filter the additional resource requests (e.g., to create filtered requests 415) based on a "watch list" of IP addresses associated with origin devices (e.g., origin device 130). The watch list may be pre-configured and/or dynamically updated via a control protocol (e.g., TCP) by request monitor 140. The watch list may include IP packets with HTTP GET requests (e.g., requesting resources) that do not match an "intercept list" (e.g., also provided in request monitor 140). The intercept list is described below in connection with FIG. 6. As further shown in FIG. 4A, request monitor 140 may report request 405 and/or filtered requests 415 to cache server 120 via a control protocol.

Response monitor 150 may monitor traffic (e.g., response flows) provided from origin device 130 to client device 110. Response monitor 150 may monitor traffic provided from other origin devices to other client devices, and may determine, based on a set of configurable parameters (e.g., object size, cache expiry time, total cacheable bandwidth, etc.), whether the traffic includes resources that may be cached (or stored) in cache server 120. As further shown in FIG. 4A, response monitor 150 may provide, to request monitor 140, addresses 420 (e.g., IP addresses) of origin devices (e.g., origin device 130) with the cacheable resources. Request monitor 140 may receive addresses 420, and may add addresses 420 to the watch list. Response monitor 150 may also generate reports 425 based on the monitored traffic. In one example, reports 425 may include a report describing potential bandwidth savings provided by cache server 120, a report describing distribution of traffic based on various parameters, such as an origin device IP address, a MIME type, a MIME size, etc.

Cache server 120 may receive filtered requests 415 (e.g., which may include request 405) from request monitor 140, and may extract information, such as uniform resource locators (URLs) provided in packets, from filtered requests 415. The extracted information may include resources available at origin devices identified by filtered requests 415 and that match the watch list (e.g., which includes IP addresses of origin devices with cacheable resources). Cache server 120 may add the extracted information as candidate resources to ingest, and may ingest the candidate resources, as indicated by reference number 430. Ingest 430 may refer to cache server 120 retrieving the candidate resources from origin devices, and storing the retrieved resources in memory associated with cache server 120. In one example, cache server 120 may ingest 430 the candidate resources from origin device 130 while request 405 is being processed. In another example, cache server 120 may ingest 430 one or more of the candidate resources at different times (e.g., after request 405 is processed). Cache server 120 may store the retrieved candidate resources in a memory device associated with cache server 120.

Intercept traffic may include traffic, generated by client device 110, that is destined for origin device 130, but may be intercepted by request monitor 140 and/or network device 170 prior to reaching origin device 130. Request monitor 140 may provide such intercept traffic to cache server 120. For intercept traffic (e.g., request 405) received from request monitor 140, cache server 120 may accept connections (e.g., TCP connections) associated with the intercept traffic, and may serve client device 110 using IP addresses of origin devices (e.g., origin device 130). Cache server 120 may address cache hit intercept traffic differently than cache miss intercept traffic. Since FIG. 4A depicts a cache miss scenario for request 405, rather than providing a proxy for request 405 to origin device 130, cache server 120 may generate a redirect command 435. Redirect command may include a command with a HTTP response status code "302." Cache server 120 may provide redirect command 435 to client device 110 (via network device 170), and may close (or terminate) a connection with client device 110. Redirect command 435 may instruct client device 110 to reconnect and retry request 405. Client device 110 may receive redirect command 435, may retry request 405 (e.g., as a new request 440), and may provide new request 440 to network device 170. New request 440 may include a request for the same resource requested by request 405.

Prior to providing redirect command 435 to client device 110, cache server 120 may provide a control message to request monitor 140. The control message may instruct request monitor 140 to add an entry for client device 110 (e.g., a 5-tuple) in an exception list (e.g., provided in request monitor 140 and described below in connection with FIG. 6). Request monitor 140 may ignore a source port (e.g., src-port) provided in the 5-tuple in order to account for client device 110 retrying request 405 (e.g., new request 440) via a different port number. Thus, request monitor 140 may key off the 4-tuple from the particular source port. The control message may ensure that the next attempt of request 405 (e.g., new request 440) from client device 110 will not be intercepted by request monitor 140 and will instead be provided to origin device 130. Alternatively, or additionally, cache server 120 may add the resources (e.g., requested by request 405 or other cache miss resources) as candidate resources to ingest (e.g., via ingest 430). Cache server 120 may retrieve the candidate resources from origin device 130 or other origin devices, and may store the retrieved candidate resources in a memory device associated with cache server 120.

As further shown in FIG. 4A, network device 170 may provide new request 440 to origin device 130. Origin device 130 may receive new request 440, may retrieve a resource 445 requested by new request 440, and may provide resource 445 to network device 170. Network device 170 may forward resource 445 to client device 110, and client device 110 may receive and/or utilize resource 445. In one example implementation, network device 170 may provide all or a portion of resource 445 to request monitor 140, and request monitor 140 may provide information associated with resource 445 in the watch list. In another example implementation, network device 170 may provide a portion 447 of resource 445 to response monitor 150 for analysis.

FIG. 4B may depict a cache hit scenario for request 405. As shown, client device 110 may provide request 405 for a resource to network device 170, and network device 170 may provide request 405 to request monitor 140. Request monitor 140 may receive request 405, and may determine, based on information provided in request monitor 140 and described below in connection with FIG. 6, whether the resource requested by request 405 is likely cached (e.g., a cache hit) in cache server 120 or not likely cached (e.g., a cache miss) in cache server 120. For the operations depicted in FIG. 4B, it is assumed that the requested resource is cached in cache server 120. Thus, request monitor 140 may provide an indication 450 of a cache hit to network device 170.

As further shown in FIG. 4B, request monitor 140 may forward request 405 and/or filtered requests 415 to cache server 120, and cache server 120 may receive request 405 and/or filtered requests 415. Cache server 120 may retrieve a cached resource 455 requested by request 405, and may provide cached resource 455 to client device 110 (via network device 170). In one example, cache server 120 may serve cached resource 455 based on cache rules that specify types of resources stored in cache server 120 and how resources are served from cache server 120. Client device 110 may receive and/or utilize cached resource 455.

In one example implementation, cache server 120 may analyze a potential cache hit ratio for each of the IP addresses of origin devices provided in the watch list maintained in request monitor 140 based on filtered requests 415. For example, cache server 120 may select a particular IP address provided in the watch list, and may determine whether the resources provided in filtered requests 415 (e.g., associated with the particular IP address) are stored in cache server 120. If a resource, provided in one of filtered requests 415, is stored in cache server 120, cache server 120 may determine that resource to be a cache hit. For the particular IP address, cache server 120 may then divide all of the determined cache hits by the total number of resources provided in filtered requests 415 (e.g., associated with the particular IP address) to calculate a potential cache hit ratio for the particular IP address. When potential cache hit ratios, associated with particular IP addresses (e.g., of particular origin devices), exceed a configurable threshold, cache server 120 may add the particular IP addresses to the intercept list maintained in request monitor 140 via a control protocol, as indicated by reference number 460.

Although FIGS. 4A and 4B show example components of network portion 400, in other implementations, network portion 400 may include fewer components, different components, differently arranged components, or additional components than depicted in FIGS. 4A and 4B. Alternatively, or additionally, one or more components of network portion 400 may perform one or more other tasks described as being performed by one or more other components of network portion 400.

Figure 5:
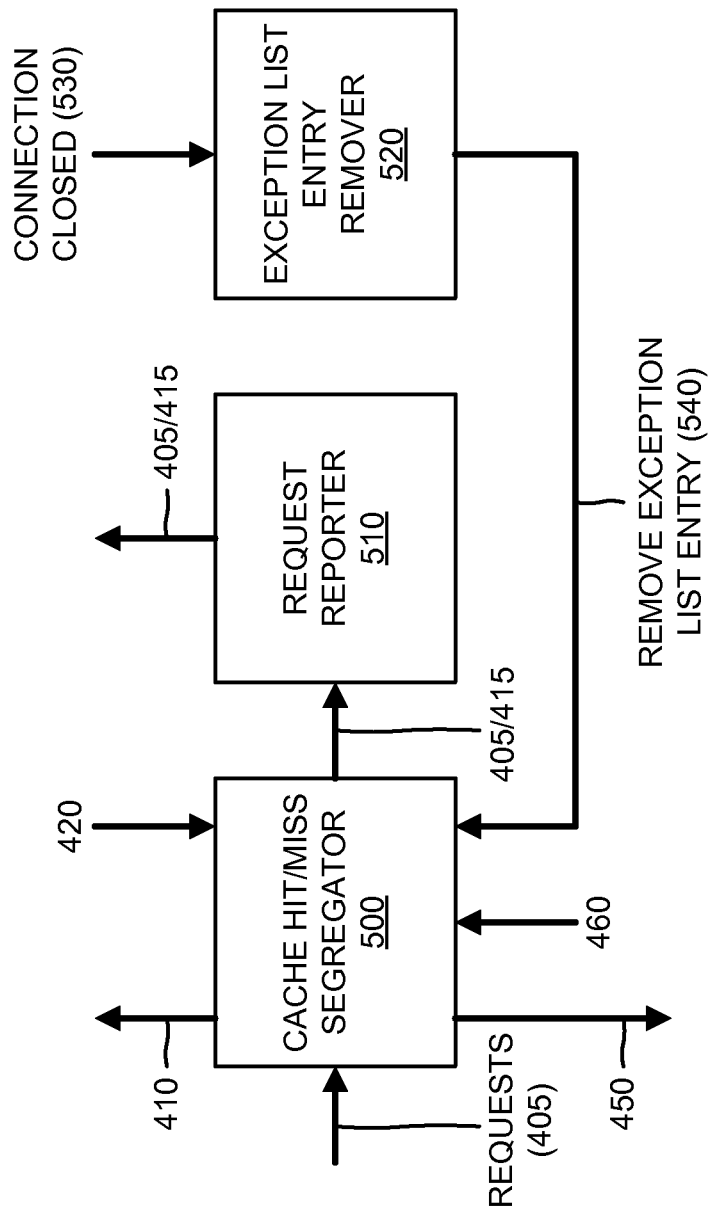
FIG. 5 is a diagram of example functional components of the request monitor depicted in FIG. 1.

FIG. 5 is a diagram of example functional components of request monitor 140. As shown, request monitor 140 may include a cache hit/miss segregator 500, a request reporter 510, and an exception list entry remover 520. In one example implementation, one or more of the functional components described in connection with FIG. 5 may be implemented by one or more of the example components of device 200 (FIG. 2) or device 300 (FIG. 3).

Cache hit/miss segregator 500 may receive request 405 from client device 110 and may receive additional resource requests from client device 110 or other client devices. Cache hit/miss segregator 500 may filter the additional resource requests (e.g., including request 405) to generate filtered requests 415. In one example, cache hit/miss segregator 500 may filter the additional resource requests (e.g., to create filtered requests 415) based on a watch list, maintained by cache hit/miss segregator 500, of IP addresses associated with origin devices (e.g., origin device 130). Cache hit/miss segregator 500 may provide request 405 and/or filtered requests 415 to request reporter 510.

Cache hit/miss segregator 500 may determine, based on information (e.g., an intercept list, an exception list, flow information, and/or a watch list described below in connection with FIG. 6), whether the resource requested by request 405 is likely cached (e.g., a cache hit) in cache server 120 or not likely cached (e.g., a cache miss) in cache server 120. In one example implementation, cache hit/miss segregator 500 may determine that the resource requested by request 405 is likely cached in cache server 120 when a destination IP address of request 405 is provided in the intercept list and not provided in the exception list. Cache hit/miss segregator 500 may determine that the resource requested by request 405 is not likely cached in cache server 120 when the destination IP address of request 405 is not provided in the intercept list or is provided in the exception list.

If cache hit/miss segregator 500 determines that the resource requested by request 405 is not likely cached in cache server 120, cache hit/miss segregator 500 may provide indication 410 of a cache miss to network device 170 and cache server 120 may provide redirect command 435 to client device 110 (via network device 170). Redirect command 435 may instruct client device 110 to reconnect and retry request 405. If cache hit/miss segregator 500 determines that the resource requested by request 405 is likely cached in cache server 120, cache hit/miss segregator 500 may provide indication 450 of a cache hit to network device 170.

As further shown in FIG. 5, cache hit/miss segregator 500 may receive addresses 420 from response monitor 150, and may add addresses 420 to the watch list maintained by cache hit/miss segregator 500. When potential cache hit ratios, associated with particular IP addresses (e.g., of particular origin devices) of request 405 and/or filtered requests 415, exceed a configurable threshold, cache server 120 may add the particular IP addresses to the intercept list, maintained in cache hit/miss segregator 500, via a control protocol, as indicated by reference number 460.

Request reporter 510 may receive request 405 and/or filtered requests 415 from cache hit/miss segregator 500. Request reporter 510 may provide request 405 and/or filtered requests 415 to cache server 120 via a control protocol.

Exception list entry remover 520 may receive an indication 530 of a connection closing with a particular client device, such as client device 110. In one example, indication 530 may be received based on a timeout value or when client device 110 generates a packet with a reset the connection (RST) flag or a packet with a no more data from sender (FIN) flag. Client device 110 may generate such packets upon receipt of redirect command 435. Exception list entry remover 520 may determine whether the packet, associated with indication 530, matches a particular 5-tuple entry provided in the exception list maintained in cache hit/miss segregator 500. If the packet, associated with indication 530, matches a particular 5-tuple entry in the exception list, exception list entry remover 520 may remove the particular 5-tuple entry from the exception list, as indicated by reference number 540.

Although FIG. 5 shows example functional components of request monitor 140, in other implementations, request monitor 140 may include fewer functional components, different functional components, differently arranged functional components, or additional functional components than depicted in FIG. 5. Alternatively, or additionally, one or more functional components of request monitor 140 may perform one or more other tasks described as being performed by one or more other functional components of request monitor 140.

Figure 6:
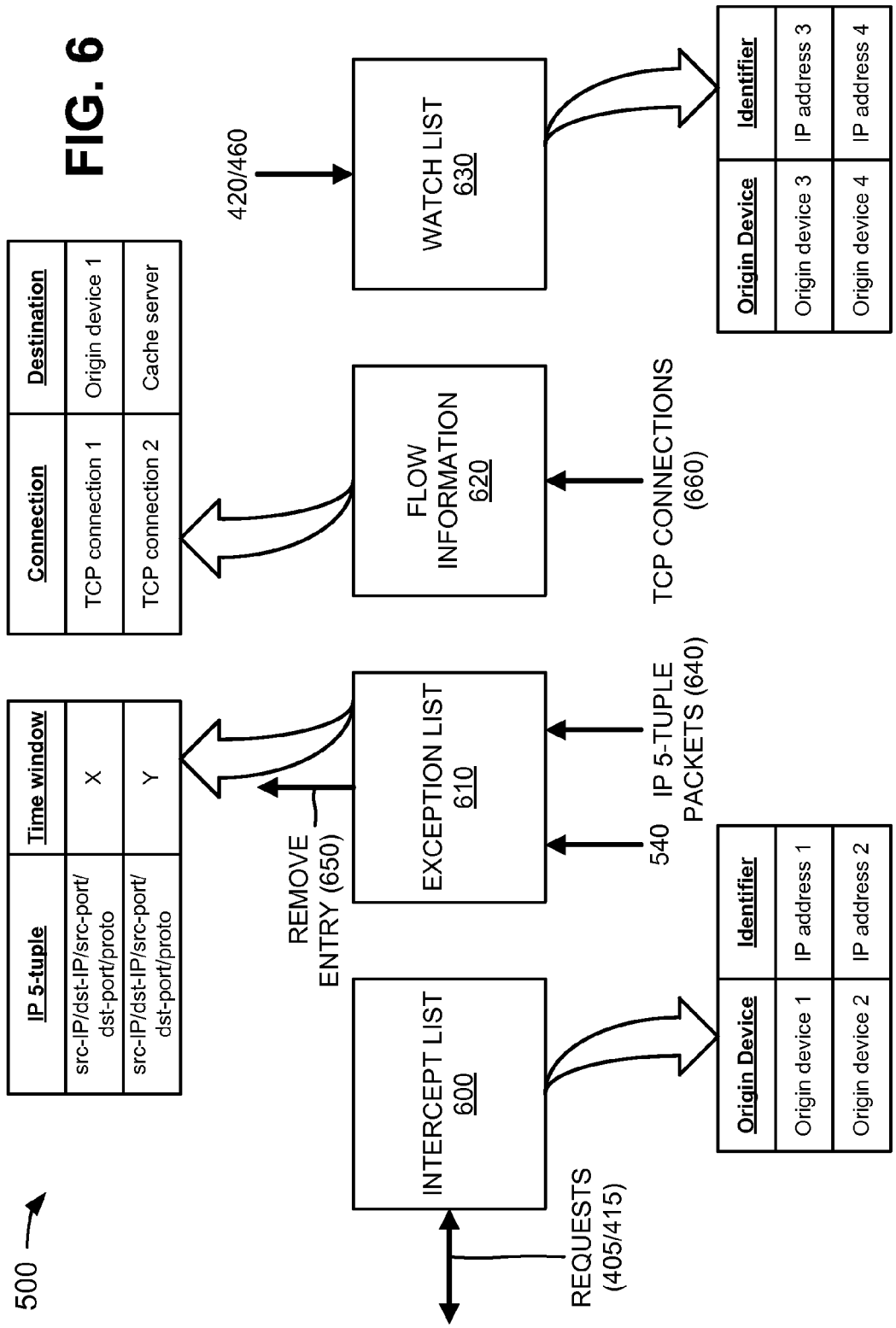
FIG. 6 is a diagram of example information maintained by a cache hit/miss segregator depicted in FIG. 5.

FIG. 6 is a diagram of example information maintained by cache hit/miss segregator 500 and/or logic to operate on the information. As shown, cache hit/miss segregator 500 may include an intercept list 600, an exception list 610, flow information 620, and a watch list 630. In one example implementation, the information may be stored in one or more memories associated with one or more of the example components of device 200 (FIG. 2) or device 300 (FIG. 3).

Intercept list 600 may include entries for addresses (e.g., IP addresses) of origin devices (e.g., origin device 130) for which resource requests from client devices (e.g., client device 110) should be intercepted and routed to cache server 120 instead of being sent to the origin devices. As shown in FIG. 6, intercept list 600 may include an origin device field, an identifier field, and a number of entries associated with these fields. The origin device field may include entries identifying origin devices for which resource requests should be intercepted and routed to cache server 120. The identifier field may include entries providing identifying information, such as IP addresses, of the origin devices identified in the origin device field.

In one example implementation, intercept list 600 may receive request 405 (or one of filtered requests 415), and may determine whether the resource requested by request 405 is associated with an IP address (e.g., of an origin device) provided in intercept list 600. For example, if the resource requested by request 405 is associated with IP address 1 (e.g., of origin device 1), intercept list 600 may route request 405 to cache server 120. However, if the resource requested by request 405 is associated with IP address 11 (e.g., of origin device 11), intercept list 600 may not route request 405 to cache server 120.

Exception list 610 may include entries for resource request packets that should be forwarded to origin devices despite matching an entry provided in intercept list 600. The entries for the resource request packets may be indexed by a 5-tuple (e.g., a source IP address (src-IP), a destination IP address (dst-IP), a source port (src-port), a destination port (dst-port), and a protocol (proto)) associated with each packet. As shown in FIG. 6, exception list 610 may include an IP 5-tuple field, a time window field, and a number of entries associated with these fields. The IP 5-tuple field may include entries providing 5-tuples of resource request packets to be forwarded to origin devices (e.g., despite a match in intercept list 600). In one example implementation, the source ports of the 5-tuple entries may be ignored or setup to be used as a range-based match depending on an addressing scheme, such as a network address translation (NAT) scheme or a direct addressing scheme, used by client device 110. The time window field may include entries for time windows during which client device (e.g., associated with 5-tuple entries provided in the IP 5-tuple field) are expected to reconnect with request monitor 140. In one example, the time windows may include periods of time that count down and expire. After expiration of a particular time window provided in the time window field, a particular 5-tuple entry associated with the particular time window may be removed from exception list 610. The time windows provided in the time window field may be limited to ensure that client devices that may be using the same IP address and connecting to the same origin device may not be prevented from using cache server 120 for a long period of time.

In one example implementation, the IP 5-tuple field of exception list 610 may be replaced with a 2-tuple field, a 3-tuple field, . . . , an N-tuple field (N≧2). Exception list 610 may store 2-tuples, 3-tuples, . . . , N-tuples of IP packets in such a field.

As further shown in FIG. 6, exception list 610 may receive IP 5-tuple packets 640 (e.g., associated with request 405 and/or filtered requests 415), and may add the 5-tuples of IP 5-tuple packets 640 as entries in the IP 5-tuple field of exception list 610. Exception list 610 may receive, from exception list entry remover 520 (FIG. 5), indication 540 to remove a particular 5-tuple entry from exception list 610, and may remove the particular 5-tuple entry from exception list 610, as indicated by reference number 650.

Flow information 620 may include entries for connections (e.g., TCP connections) of client devices that are being redirected to cache server 120 or connections of client devices that are being directed to origin devices based on exception list 610. As shown in FIG. 6, flow information 620 may include a connection field, a destination field, and a number of entries associated with these fields. The connection field may include entries identifying connections of client devices that are being directed to cache server 120 or to origin devices based on exception list 610. The destination field may include entries providing destination devices of the connections identified in the connection field. For example, flow information 620 may indicate that TCP connection 1 is to be directed to origin device 1, and that TCP connection 2 is to be directed to cache server 120. As further shown in FIG. 6, flow information 620 may receive TCP connections 660 from client devices (e.g., client device 110), and may populate flow information 620 with TCP connections 660 and destinations associated with TCP connections 660.

Watch list 630 may include entries for addresses (e.g., IP addresses) of origin devices (e.g., origin device 130) from which requests from client devices (e.g., client device 110) may retrieve resources. As shown in FIG. 6, watch list 630 may include an origin device field, an identifier field, and a number of entries associated with these fields. The origin device field may include entries identifying origin devices from which resources may be retrieved. The identifier field may include entries providing identifying information, such as IP addresses, of the origin devices identified in the origin device field. As further shown in FIG. 6, watch list 630 may receive addresses 420 (e.g., IP addresses) of origin devices with cacheable resources from response monitor 150 (e.g., via cache server 120), and may receive particular IP addresses 460 (e.g., of particular origin devices) from cache server 120 when potential cache hit ratios, associated with the particular IP addresses 460, exceed a configurable threshold. Watch list 630 may populate watch list 640 with IP addresses 420 and 460, as well as with information identifying origin devices associated with IP addresses 420 and 460.

In one example implementation, request monitor 140 may utilize one or more of intercept list 600, exception list 610, flow information 620, and/or watch list 630 to determine whether to make a determination as to whether the resource requested by request 405 is likely cached (e.g., a cache hit) in cache server 120 or not likely cached (e.g., a cache miss) in cache server 120.

Although FIG. 6 shows example information that may be maintained in cache hit/miss segregator 500, in other implementations, cache hit/miss segregator 500 may include less information, different information, differently arranged information, or additional information than depicted in FIG. 6.

Figure 7:
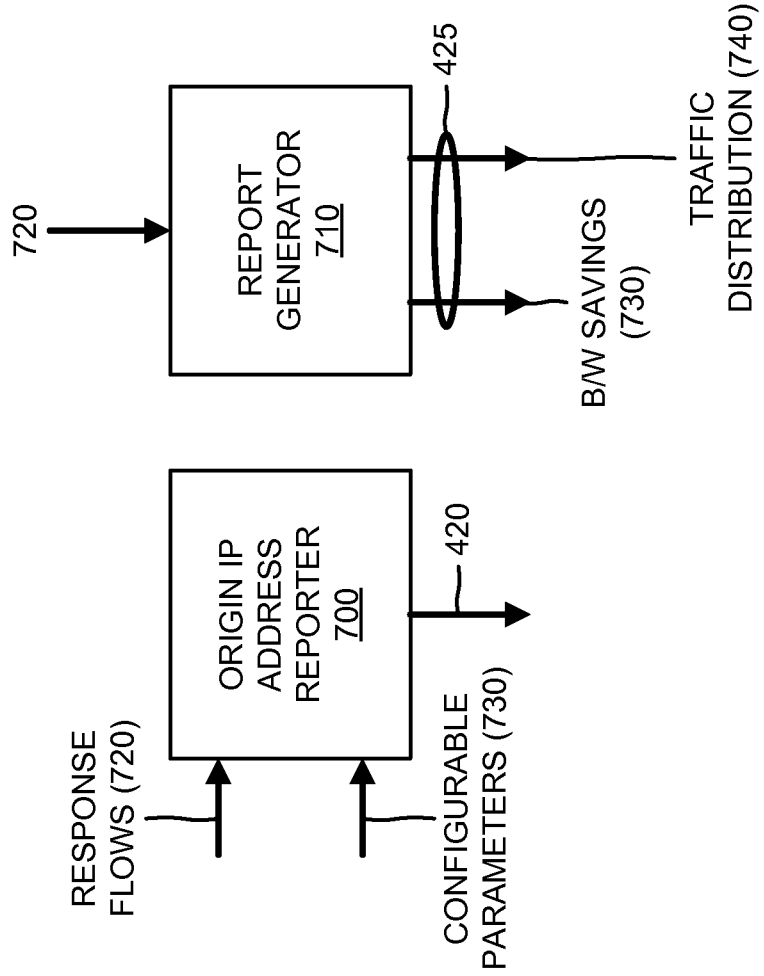
FIG. 7 is a diagram of example functional components of the response monitor depicted in FIG. 1.

FIG. 7 is a diagram of example functional components of response monitor 150. As shown, response monitor 150 may include an origin IP address reporter 700 and a report generator 710. In one example implementation, one or more of the functional components, described in connection with FIG. 7, may be implemented by one or more of the example components of device 200 (FIG. 2) or device 300 (FIG. 3).

Origin IP address reporter 700 may receive response flows 720 provided from origin devices (e.g., origin device 130) to client devices (e.g., client device 110), and may receive configurable parameters 730 (e.g., from a network administrator) via a control protocol. Response flows 720 may include responses from origin devices to client devices, and may include HTTP response headers. Configurable parameters 730 may include object size (e.g., of resources to cache), cache expiry time (e.g., of cache server 120), total cacheable bandwidth (e.g., of cache server 120), etc. Origin IP address reporter 700 may examine response flows 720 (e.g., for cacheable resources) based on the HTTP response headers included in response flows 720. Origin IP address reporter 700 may determine, based on examination of response flows 720 and based on configurable parameters 730, whether response flows 720 include resources that may be stored in cache server 120. As further shown in FIG. 7, origin IP address reporter 700 may provide, to cache server 120, addresses 420 (e.g., IP addresses) of origin devices (e.g., origin device 130) determined to contain cacheable resources (e.g., based on the examination of response flows 720).

Report generator 710 may receive response flows 720. Report generator 710 may generate reports 425 based on response flows 720. In one example, reports 425 may include a report 730 describing potential bandwidth savings provided by cache server 120, a report 740 describing distribution of traffic based on various parameters (e.g., an origin device IP address, a MIME type, a MIME size, etc.), or another type of report.

Although FIG. 7 shows example functional components of response monitor 150, in other implementations, response monitor 150 may include fewer functional components, different functional components, differently arranged functional components, or additional functional components than depicted in FIG. 7. Alternatively, or additionally, one or more functional components of response monitor 150 may perform one or more other tasks described as being performed by one or more other functional components of response monitor 150.

Figure 8:
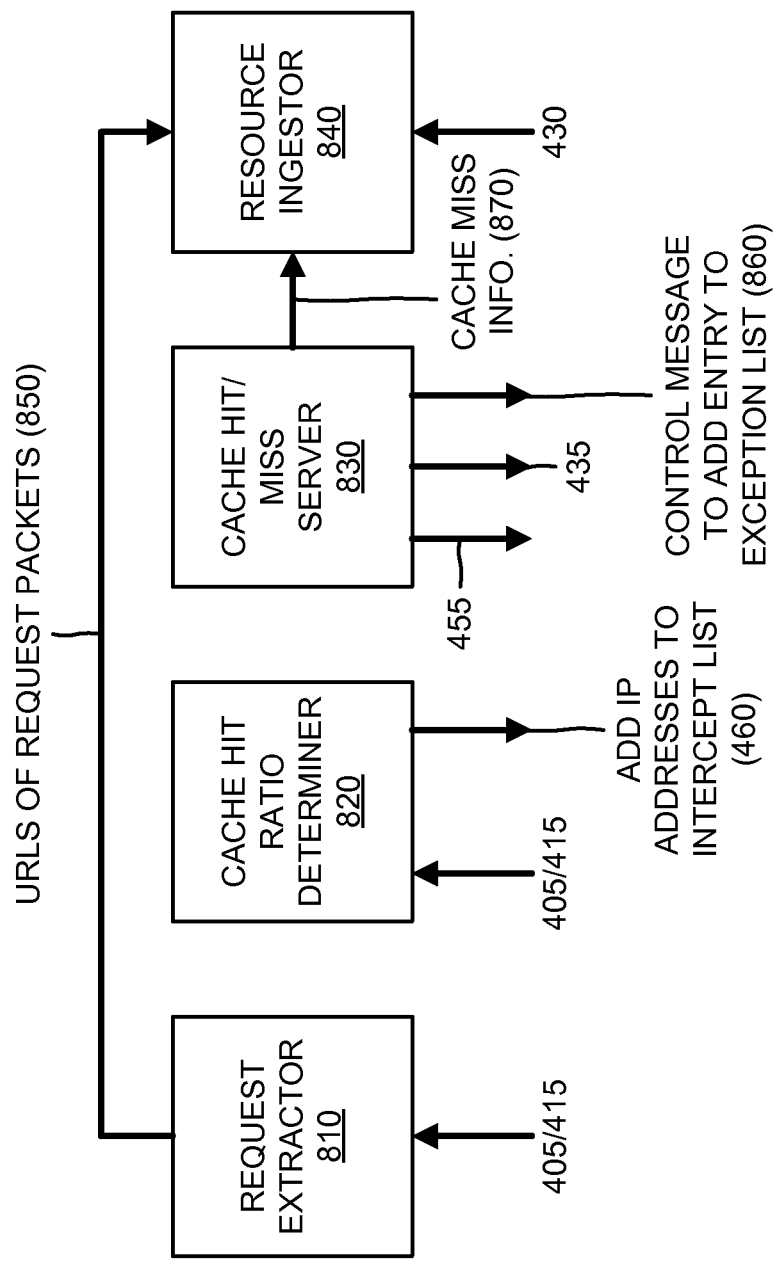
FIG. 8 is a diagram of example functional components of the cache server depicted in FIG. 1.

FIG. 8 is a diagram of example functional components of cache server 120. As shown, cache server 120 may include a request extractor 810, a cache hit ratio determiner 820, a cache hit/miss server 830, and a resource ingestor 840. In one example implementation, one or more of the functional components, described in connection with FIG. 8, may be implemented by one or more of the example components of device 200 (FIG. 2).

Request extractor 810 may receive request 405 and/or filtered requests 415 from request monitor 140, and may extract information (e.g., URLs 850 provided in packets) from request 405 and/or filtered requests 415. URLs 850 may include resources available at origin devices identified by request 405 and/or filtered requests 415. Request extractor 810 may provide URLs 850 to resource ingestor 840 as candidate resources to ingest (e.g., retrieve from origin devices and store in cache server 120).

Cache hit ratio determiner 820 may receive intercept traffic (e.g., request 405 and/or filtered requests 415) from request monitor 140. Cache hit ratio determiner 820 may determine a potential cache hit ratio for each of the IP addresses (e.g., of origin devices) provided in watch list 630 (e.g., maintained in request monitor 140) based on request 405 and/or filtered requests 415. When cache hit ratio determiner 820 determines that potential cache hit ratios, associated with particular IP addresses (e.g., of particular origin devices), exceed a configurable threshold, cache hit ratio determiner 820 may add the particular IP addresses to intercept list 600 (e.g., maintained in request monitor 140) via a control protocol, as indicated by reference number 460.

Cache hit/miss server 830 may address cache hit intercept traffic differently than cache miss intercept traffic. For cache miss intercept traffic, cache hit/miss server 830 may generate redirect command 435, may provide redirect command 435 to client device 110 (via network device 170), and may close a connection with client device 110. Prior to providing redirect command 435 to client device 110, cache hit/miss server 830 may provide a control message 860 to request monitor 140. Control message 860 may instruct request monitor 140 to add an entry for client device 110 (e.g., a 5-tuple) in exception list 610 provided in request monitor 140. Control message 860 may ensure that the next attempt of request 405 (e.g., new request 440) from client device 110 will not be intercepted by request monitor 140 and will instead be provided to origin device 130. Alternatively, or additionally, cache hit/miss server 830 may provide the resources associated with cache miss information 870 (e.g., requested by request 405, filtered requests 415, and/or other cache miss requests) to resource ingestor 840 as candidate resources to ingest.

For cache hit intercept traffic, cache hit/miss server 830 may retrieve cached resource 455 requested by request 405 and/or filtered requests 415, and may provide cached resource 455 to client device 110 (via network device 170). In one example, cache hit/miss server 830 may serve cached resource 455 based on cache rules that specify types of resources stored in cache server 120 and how resources are served from cache server 120.

Resource ingestor 840 may receive URLs 850 from request extractor 810, and may receive the resources associated with cache miss information 870 from cache hit/miss server 830, as candidate resources to ingest. Resource ingestor 840 may ingest the candidate resources, as indicated by reference number 430. In one example, resource ingestor 840 may ingest 430 the candidate resources from origin device 130 while request 405 is being processed. In another example, resource ingestor 840 may ingest 430 one or more of the candidate resources from different origin devices and at different times (e.g., after request 405 is processed). Cache server 120 may store the retrieved resources in a memory device associated with cache server 120. During ingest 430, for example, resource ingestor 840 may provide a request for the candidate resources to origin device 130, and origin device 130 may receive the request. Origin device 130 may retrieve the candidate resources based on the request, and may provide the candidate resources to resource ingestor 840. Resource ingestor 840 may store the received candidate resources in a memory device associated with cache server 120.

Although FIG. 8 shows example functional components of cache server 120, in other implementations, cache server 120 may include fewer functional components, different functional components, differently arranged functional components, or additional functional components than depicted in FIG. 8. Alternatively, or additionally, one or more functional components of cache server 120 may perform one or more other tasks described as being performed by one or more other functional components of cache server 120.

In one example implementation, cache server 120, request monitor 140, and response monitor 150 may be deployed as standalone components in a service provider network. In another example implementation, cache server 120, request monitor 140, and response monitor 150 may be integrated into single device (e.g., a single server, a single media flow controller, a single network device, etc.). In still another example implementation, the functionality of request monitor 140 may be integrated in cache server 120 or network device 170. In a further example implementation, request monitor 140 and response monitor 150 may be implemented as applications executing on network device 170. In such an implementation, request monitor 140 may use flow information (e.g., similar to flow information 620) in line cards of network device 170 to implement exception list 610. In another example implementation, the functionality of one or more of cache server 120, request monitor 140, and response monitor 150 may be integrated in network device 170. In still another example implementation, request monitor 140 may act as a load balancer for multiple cache servers for scaling or adding redundancy to a deployment. In such an implementation, request monitor 140 may use flow information 620 to keep track of cache servers associated with each intercepted TCP connection.

In an alternative implementation, systems and/or methods described herein may use alternative IP addresses of origin devices, rather than exception list 610. It may be common for many origin devices (or sites) to have multiple IP addresses that provide the same resource (e.g., a domain name system (DNS) round robin for load balancing). In such scenarios, systems and/or methods described herein may omit one or more of the redundant IP addresses from watch list 630, and may use the omitted IP addresses as targets for redirect command 435 (FIG. 4).

In another alternative implementation, systems and/or methods described herein may replace response monitor 150 with a configuration driven watch list (e.g., similar to watch list 630) provided in request monitor 140. For example, systems and/or methods described herein may configure a list of domains and request monitor 140 may perform a DNS lookup to build the configuration driven watch list.

FIGS. 9 and 10 are flow charts of an example process 900 for providing request monitoring functionality for a proxy cache scheme according to an implementation described herein. In one implementation, process 900 may be performed by request monitor 140. In another implementation, some or all of process 900 may be performed by one or more devices other than request monitor 140 or in combination with request monitor 140. One or more of the process blocks depicted in FIGS. 9 and 10 may be performed concurrently and independently of one or more other process blocks.

As illustrated in FIG. 9, process 900 may include receiving, from a client device, a request for a resource (block 910), and determining, based on information, whether the requested resource is likely cached (a cache hit) or not likely cached (a cache miss) (block 920). For example, in an implementation described above in connection with FIG. 4A, client device 110 may provide request 405 for a resource to network device 170, and network device 170 may provide request 405 to request monitor 140. Request monitor 140 may receive request 405, and may determine, based on information (e.g., provided in request monitor 140), whether the resource requested by request 405 is likely cached (e.g., a cache hit) in cache server 120 or not likely cached (e.g., a cache miss) in cache server 120.

As further shown in FIG. 9, when the requested resource is likely cached (block 920—CACHE HIT), process 900 may include forwarding the request to a cache server, where the cache server retrieves a cached resource based on the request and forwards the cached resource to the client device (block 930). For example, in an implementation described above in connection with FIG. 4B, cache server 120 may receive request 405 and/or filtered requests 415. Cache server 120 may retrieve cached resource 455 requested by request 405, and may provide cached resource 455 to client device 110 (via network device 170). Client device 110 may receive and/or utilize cached resource 455.

Returning to FIG. 9, when the requested resource is not likely cached (block 920—CACHE MISS), process 900 may include forwarding the request to the cache server, where the cache server forwards a redirect command to the client device, based on the request, and the client device obtains the resource from an origin device based on the redirect command (block 940). For example, in an implementation described above in connection with FIG. 4A, request monitor 140 may report request 405 and/or filtered requests 415 to cache server 120 via a control protocol. Cache server 120 may generate redirect command 435 (e.g., a command with a HTTP response status code "302"), may provide redirect command 435 to client device 110 (via network device 170), and may close a connection with client device 110. Redirect command 435 may instruct client device 110 to reconnect and retry request 405. Client device 110 may receive redirect command 435, may retry request 405 (e.g., as a new request 440), and may provide new request 440 to network device 170. New request 440 may include a request for the same resource requested by request 405.

Process block 920 may include the process blocks depicted in FIG. 10. As shown in FIG. 10, process block 920 may include creating an intercept list that includes entries for origin IP addresses associated with traffic to be routed to the cache server (block 1000); creating an exception list that includes entries for IP 5-tuples of packets to be routed to the origin device despite a match in the intercept list (block 1010); creating flow information that includes entries for connections directed toward the cache server or the origin device (block 1020); and/or creating a watch list that includes entries for origin device IP addresses (block 1030). Process block 920 may further include determining, based on the intercept list and the exception list whether or not the requested resource is likely cached (block 1040).

For example, in an implementation described above in connection with FIGS. 5 and 6, request monitor 140 may include cache hit/miss segregator 500. Cache hit/miss segregator 500 may include intercept list 600, exception list 610, flow information 620, and watch list 630. As described above, intercept list 600 may include entries for addresses (e.g., IP addresses) of origin devices (e.g., origin device 130) for which resource requests from client devices (e.g., client device 110) should be intercepted and routed to cache server 120 instead of sending to the origin devices. Exception list 610 may include entries for resource request packets that should be forwarded to origin devices despite matching an entry provided in intercept list 600. The entries for the resource request packets may be indexed by a 5-tuple associated with each packet. Flow information 620 may include entries for connections (e.g., TCP connections) of client devices that are being redirected to cache server 120 or connections of client devices that are being directed to origin devices based on exception list 610. Watch list 630 may include entries for addresses of origin devices from which resources may be retrieved. Cache hit/miss segregator 500 may determine, based on information (e.g., intercept list 600, exception list 610, flow information 620, and/or watch list 630), whether the resource requested by request 405 is likely cached (e.g., a cache hit) in cache server 120 or not likely cached (e.g., a cache miss) in cache server 120.

FIG. 11 is a flow chart of an example process 1100 for providing response monitoring functionality for a proxy cache scheme according to an implementation described herein. In one implementation, process 1100 may be performed by response monitor 150. In another implementation, some or all of process 1100 may be performed by one or more devices other than response monitor 150 or in combination with response monitor 150. One or more of the process blocks depicted in FIG. 11 may be performed concurrently and independently of one or more other process blocks.

As illustrated in FIG. 11, process 1100 may include receiving traffic provided from origin devices to client devices (block 1110), and determining, based on parameters, whether the traffic includes resources to cache in a cache server (block 1120). For example, in an implementation described above in connection with FIG. 4A, response monitor 150 may monitor traffic (e.g., response flows) provided from origin device 130 to client device 110. Response monitor 150 may monitor traffic provided from other origin devices to other client devices, and may determine, based on a set of configurable parameters (e.g., object size, cache expiry time, total cacheable bandwidth, etc.), whether the traffic includes resources that may be stored in cache server 120.

As further shown in FIG. 11, process 1100 may include providing, to a request monitor, IP addresses of origin devices determined to have cacheable resources (block 1130), and/or generating, based on the traffic determination, a potential bandwidth savings report and a traffic distribution report (block 1140). For example, in an implementation described above in connection with FIG. 4A, response monitor 150 may provide, to request monitor 140, addresses 420 (e.g., IP addresses) of origin devices (e.g., origin device 130) with the cacheable resources. Request monitor 140 may receive addresses 420, and may add addresses 420 to the watch list. Response monitor 150 may also generate reports 425 based on the monitored traffic. In one example, reports 425 may include a report describing potential bandwidth savings provided by cache server 120, a report describing distribution of traffic based on various parameters (e.g., an origin device IP address, a MIME type, a MIME size, etc.), or another type of report.

Figure 12A:
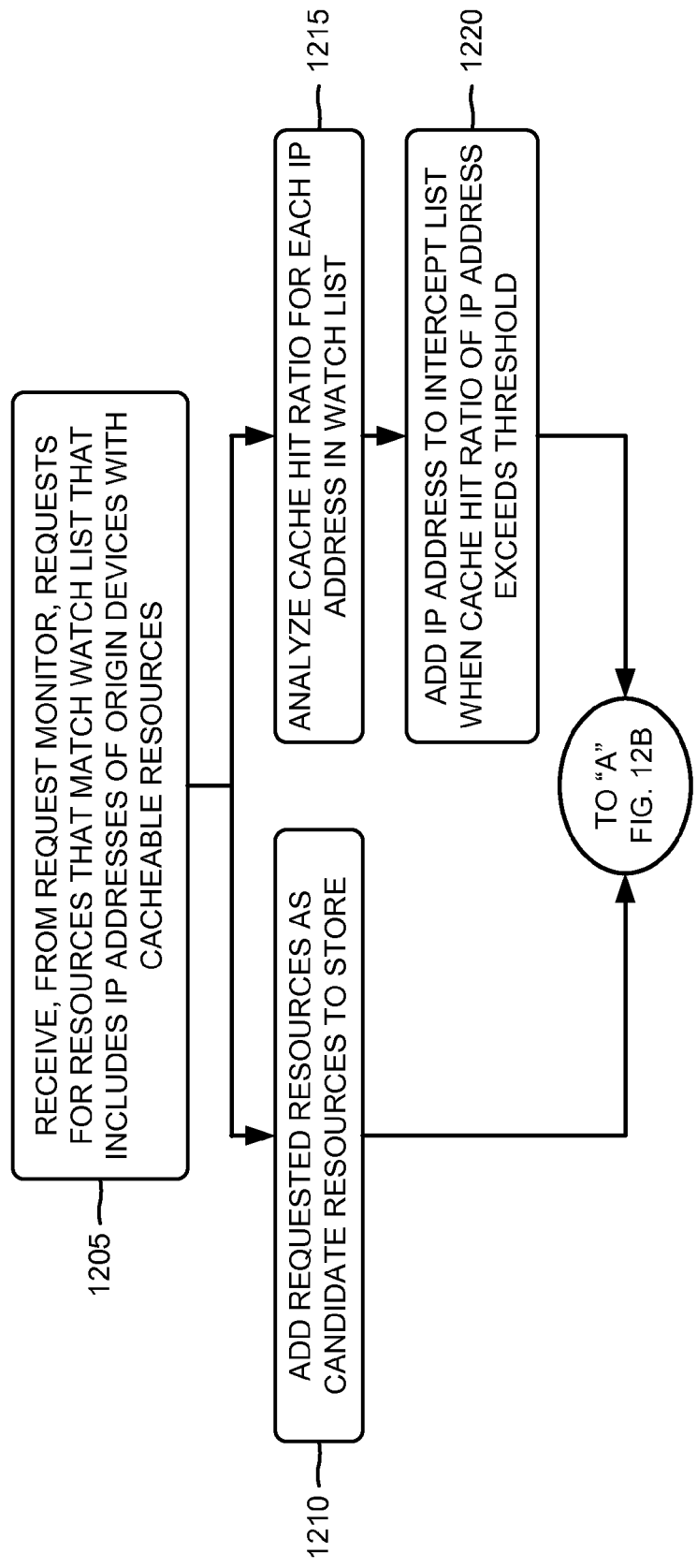

FIGS. 12A and 12B depict a flow chart of an example process 1200 for providing a modular transparent proxy cache according to an implementation described herein. In one implementation, process 1200 may be performed by cache server 120. In another implementation, some or all of process 1200 may be performed by one or more devices other than cache server 120 or in combination with cache server 120. One or more of the process blocks depicted in FIGS. 12A and 12B may be performed concurrently and independently of one or more other process blocks.

As illustrated in FIG. 12A, process 1200 may include receiving, from a request monitor, requests for resources that match entries in a watch list that includes IP addresses of origin devices with cacheable resources (block 1205), and adding the requested resources as candidate resources to store (block 1210). For example, in an implementation described above in connection with FIG. 4A, cache server 120 may receive filtered requests 415 (e.g., which may include request 405) from request monitor 140, and may extract information, such as URLs provided in packets, from filtered requests 415. The extracted information may include resources available at origin devices identified by filtered requests 415 and that match the watch list (e.g., which includes IP addresses of origin devices with cacheable resources). Cache server 120 may add the extracted information as candidate resources to ingest. In one example, request monitor 140 may filter the additional resource requests (e.g., to create filtered requests 415) based on the watch list of IP addresses associated with origin devices.

As further shown in FIG. 12A, process 1200 may include analyzing a cache hit ratio for each IP address in the watch list (block 1215), and adding an IP address to an intercept list when the cache hit ratio of the IP address exceeds the threshold (block 1220). For example, in an implementation described above in connection with FIGS. 4A and 4B, cache server may analyze a potential cache hit ratio for each of the IP addresses (e.g., of origin devices) provided in the watch list, maintained in request monitor 140, based on filtered requests 415. When potential cache hit ratios, associated with particular IP addresses of particular origin devices, exceed a configurable threshold, cache server 120 may add the particular IP addresses to the intercept list maintained in request monitor 140, via a control protocol, as indicated by reference number 460.

As shown in FIG. 12B, process 1200 may include determining whether a resource requested by intercept traffic received from the request monitor is stored (a cache hit) or not stored (a cache miss) (block 1225). When the requested resource is stored (block 1225-CACHE HIT), process 1200 may include providing the stored resource to the client device (block 1230). For example, in an implementation described above in connection with FIGS. 4A and 4B, for intercept traffic (e.g., request 405) received from request monitor 140, cache server 120 may accept connections (e.g., TCP connections) associated with the intercept traffic, and may serve client device 110 using an IP address of origin device 130 (e.g., to mask an address associated with cache server 120). For a cache hit, cache server 120 may receive request 405 and/or filtered requests 415. Cache server 120 may retrieve cached resource 455 requested by request 405, and may provide cached resource 455 to client device 110 (via network device 170).

As further shown in FIG. 12B, when the requested resource is not stored (block 1225-CACHE MISS), process 1200 may include returning a redirect command to the client device (block 1235), closing a connection with the client device (block 1240), and adding the requested resource from the intercept traffic as a candidate resource to store (block 1245). For example, in an implementation described above in connection with FIG. 4A, in a cache miss scenario for request 405, rather than providing a proxy for request 405 (e.g., serving resources on behalf of origin device 130), cache server 120 may generate redirect command 435 (e.g., a command with a HTTP response status code "302"), may provide redirect command 435 to client device 110 (via network device 170), and may close a connection with client device 110. Cache server 120 may add the resources (e.g., requested by request 405 or other cache miss resources) as candidate resources to ingest (e.g., via ingest 430).

Returning to FIG. 12B, process 1200 may include retrieving candidate resources from origin devices (block 1250), and storing the retrieved candidate resources (block 1255). For example, in an implementation described above in connection with FIG. 4A, cache server 120 may add the extracted information as candidate resources to ingest (e.g., retrieve from origin devices and store in cache server 120), and may ingest the candidate resources, as indicated by reference number 430. Cache server 120 may store the retrieved candidate resources in a memory device associated with cache server 120.

Figure 13:
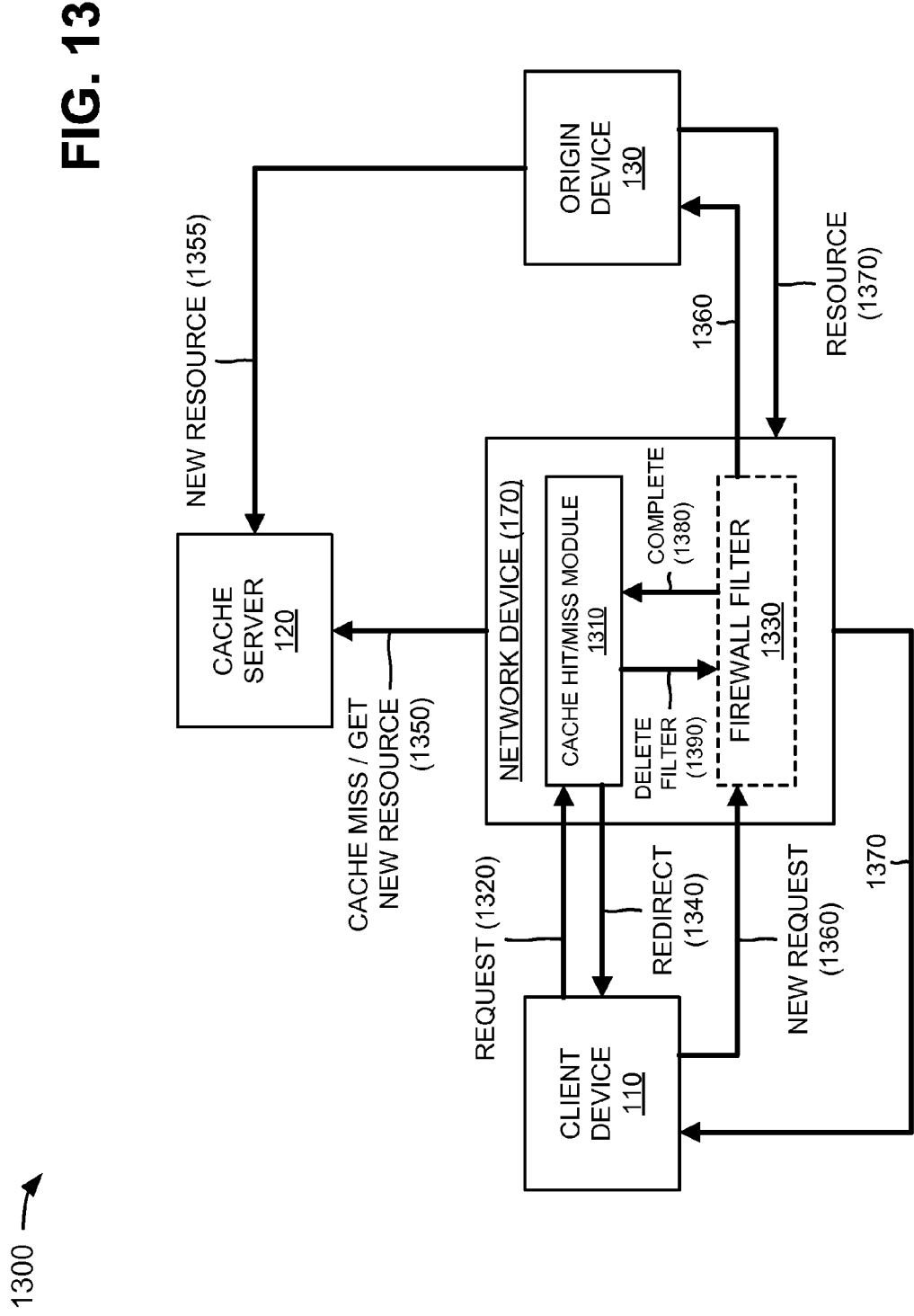
FIG. 13 is a diagram of example operations capable of being performed by another example portion of the network illustrated in FIG. 1.

FIG. 13 is a diagram of example operations capable of being performed by another example portion 1300 of network 100. As shown in FIG. 13, example network portion 1300 may include client device 110, cache server 120, origin device 130, and network device 170. Client device 110, cache server

120, origin device 130, and network device 170 may include the features described above in connection with, for example, one or more of FIGS. 1-12B.

As shown in FIG. 13, network device 170 may include a cache hit/miss module 1310. In one example, cache hit/miss module 1310 may include cache/hit miss software, executing on hardware, provided in a service plane of network device 170. Client device 110 may provide a request 1320 for a resource to network device 170, and network device 170 may receive request 1320 via cache hit/miss module 1310. Cache hit/miss module 1310 may act as a proxy for requests from client device 110, and may send replies back to client device 110 until cache hit/miss module 1310 determines that request 1320 is a HTTP GET request (e.g., requesting a specified resource) or a HTTP HEAD request (e.g., requesting a resource similar to a GET request). Once cache hit/miss module 1310 determines that request 1320 is a HTTP GET or HEAD request, cache hit/miss module 1310 may determine whether the resource requested by request 1320 is cached (e.g., a cache hit) in cache server 120 or not cached (e.g., a cache miss) in cache server 120. In one example implementation, cache hit/miss module 1310 may determine whether the resource requested by request 1320 is cached or not cached in cache server 120 based on information (e.g., intercept list 600, exception list 610, flow information 620, and/or watch list 630, as described above in connection with FIG. 6) provided in network device 170.

If cache hit/miss module 1310 determines that the resource requested by request 1320 is not cached (e.g., a cache miss) in cache server 120, cache hit/miss module 1310 may establish a temporary firewall filter 1330 in network device 170. Firewall filter 1330 may include a temporary filter provided in a firewall associated with network device 170, and may enable resource requests from client device 110 to be sent to origin device 130 using a forwarding plane. After, before, or while establishing firewall filter 1330, cache hit/miss module 1310 may generate a redirect command 1340 (e.g., a command with a HTTP response status code "302"), may provide redirect command 1340 to client device 110, and may close a connection with client device 110. Redirect command 1340 may instruct client device 110 to reconnect and retry request 1320. Cache hit/miss module 1310 may also inform cache server 120 of the cache miss associated with request 1320, and may instruct cache server 120 to obtain the resource requested by request 1320, as indicated by reference number 1350. Cache server 120 may receive instruction 1350, and may retrieve a new resource 1355 (e.g., requested by request 1320) from origin device 130. In one example implementation, cache hit/miss module 1310 and cache server 120 may communicate separately until cache server 120 retrieves new resource 1355 from origin device 130.

Client device 110 may receive redirect command 1340, may retry request 1320 (e.g., as a new request 1360 to initiate a TCP connection with origin device 130), and may provide new request 1360 to firewall filter 1330 of network device 170. New request 1360 may include a request for the same resource requested by request 1320. Firewall filter 1330 may receive new request 1360, and may forward new request 1360 to origin device 130, without cache hit/miss module 1310 being involved. Origin device 130 may receive new request 1360, may retrieve a resource 1370 requested by new request 1360, and may provide resource 1370 to network device 170. Network device 170 may forward resource 1370 to client device 110, and client device 110 may receive and/or utilize resource 1370.

After client device 110 receives resource 1370, firewall filter 1330 may provide, to cache hit/miss module 1310, a notification 1380 indicating that the session associated with retrieval of resource 1370 is complete. When cache hit/miss module 1310 receives notification 1380, cache hit/miss module 1310 may remove firewall filter 1330 (e.g., from the firewall associated with network device 170), as indicated by reference number 1390, so that any new requests from client device 110 may go through cache hit/miss module 1310 again.

Although FIG. 13 shows example components of network portion 1300, in other implementations, network portion 1300 may include fewer components, different components, differently arranged components, or additional components than depicted in FIG. 13. Alternatively, or additionally, one or more components of network portion 1300 may perform one or more other tasks described as being performed by one or more other components of network portion 1300.

Figure 14:
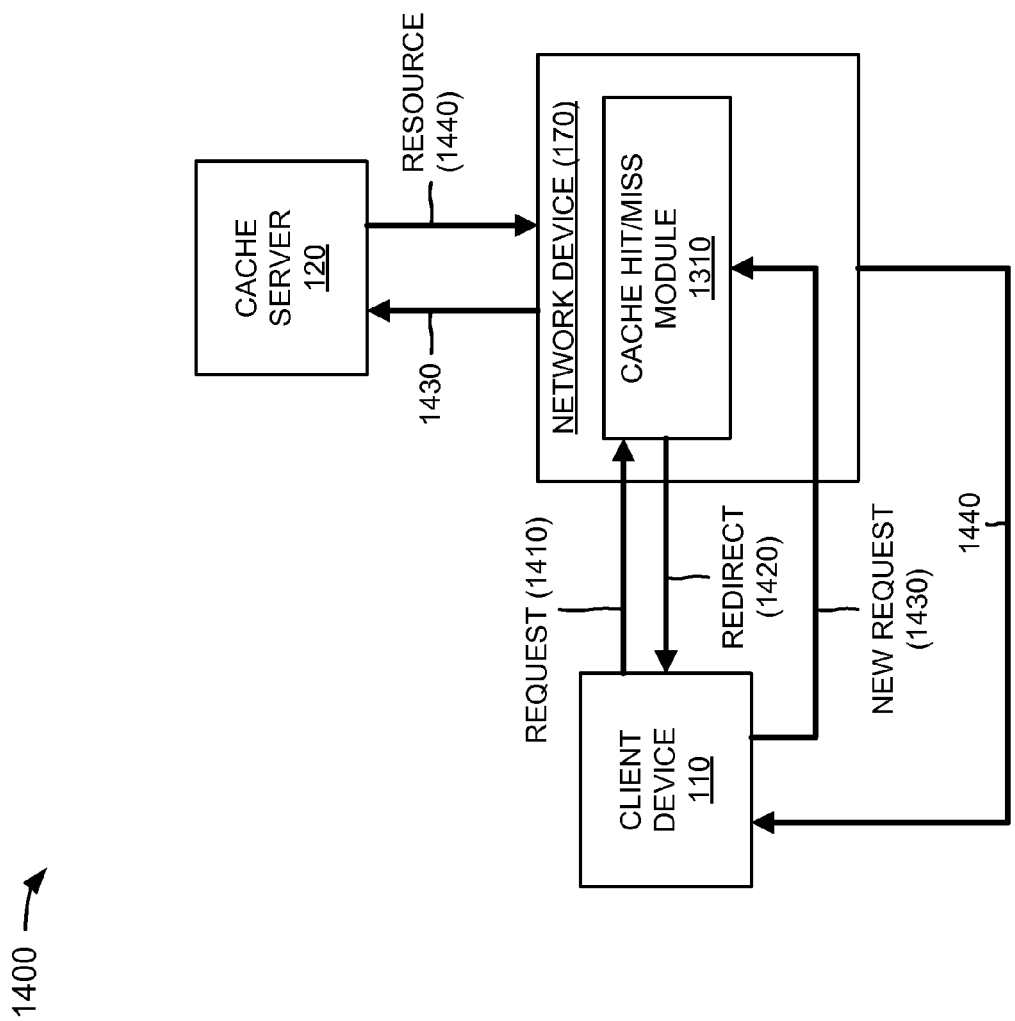
FIG. 14 is a diagram of example operations capable of being performed by still another example portion of the network illustrated in FIG. 1.

FIG. 14 is a diagram of example operations capable of being performed by still another example portion 1400 of network 100. As shown in FIG. 14, example network portion 1400 may include client device 110, cache server 120, and network device 170 (with cache hit/miss module 1310). Client device 110, cache server 120, network device 170, and cache hit/miss module 1310 may include the features described above in connection with, for example, one or more of FIGS. 1-13.

As further shown in FIG. 14, client device 110 may provide a request 1410 for a resource to network device 170, and network device 170 may receive request 1410 via cache hit/miss module 1310. Cache hit/miss module 1310 may act as a proxy for requests from client device 110, and may send replies back to client device 110 until cache hit/miss module 1310 determines that request 1410 is a HTTP GET or HEAD request. Once cache hit/miss module 1310 determines that request 1410 is a HTTP GET or HEAD request, cache hit/miss module 1310 may determine whether the resource requested by request 1410 is cached (e.g., a cache hit) in cache server 120 or not cached (e.g., a cache miss) in cache server 120.

If cache hit/miss module 1310 determines that the resource requested by request 1410 is cached (e.g., a cache hit) in cache server 120, cache hit/miss module 1310 may generate a redirect command 1420 (e.g., a command with a HTTP response status code "302"), may provide redirect command 1420 to client device 110, and may close a connection with client device 110. Redirect command 1420 may instruct client device 110 to reconnect and retry request 1410. Client device 110 may receive redirect command 1420, may retry request 1410 (e.g., as a new request 1430 to initiate a TCP connection with cache server 120), and may provide new request 1430 to network device 170. New request 1430 may include a request for the same resource requested by request 1410, but may include an address of cache server 120 (e.g., whereas request 1410 may not include the address of cache server 120).

Cache hit/miss module 1310 may receive new request 1430, and may determine that new request 1430 includes the address of cache server 120. Based on the address of cache server 120, cache hit/miss module 1310 may forward new request 1430 to cache server 120. Cache server 120 may receive new request 1430, may retrieve a resource 1440 requested by new request 1430, and may provide resource 1440 to network device 170. Network device 170 may forward resource 1440 to client device 110, and client device 110 may receive and/or utilize resource 1440.

Although FIG. 14 shows example components of network portion 1400, in other implementations, network portion 1400 may include fewer components, different components, differently arranged components, or additional components than depicted in FIG. 14. Alternatively, or additionally, one or more components of network portion 1400 may perform one or more other tasks described as being performed by one or more other components of network portion 1400.

FIG. 15 is a flow chart of an example process 1500 for optimizing content flow in a proxy cache scheme according to an implementation described herein. In one implementation, process 1500 may be performed by network device 170. In another implementation, some or all of process 1500 may be performed by one or more devices other than network device 170 or in combination with network device 170. One or more of the process blocks depicted in FIG. 15 may be performed concurrently and independently of one or more other process blocks.

As illustrated in FIG. 15, process 1500 may include receiving, via a cache hit/miss module and from a client device, a request for a resource (block 1510), and determining, via the cache hit/miss module, whether the requested resource is cached (a cache hit) or not cached (a cache miss) (block 1520). For example, in an implementation described above in connection with FIG. 13, client device 110 may provide request 1320 for a resource to network device 170, and network device 170 may receive request 1320 via cache hit/miss module 1310. Cache hit/miss module 1310 may act as a proxy for requests from client device 110, and may send replies back to client device 110 until cache hit/miss module 1310 determines that request 1320 is a HTTP GET request (e.g., requesting a specified resource) or a HTTP HEAD request (e.g., requesting a resource similar to a GET request). Once cache hit/miss module 1310 determines that request 1320 is a HTTP GET or HEAD request, cache hit/miss module 1310 may determine whether the resource requested by request 1320 is cached (e.g., a cache hit) in cache server 120 or not cached (e.g., a cache miss) in cache server 120.

As further shown in FIG. 15, when the requested resource is cached (block 1520—CACHE HIT), process 1500 may include providing a command instructing the client device to request the resource from a cache server (block 1530), receiving a new request from the client device based on the command (block 1540), and enabling the client device to receive the requested resource from the cache server based on the new request (block 1550). For example, in an implementation described above in connection with FIG. 14, if cache hit/miss module 1310 determines that the resource requested by request 1410 is cached (e.g., a cache hit) in cache server 120, cache hit/miss module 1310 may generate redirect command 1420, and may provide redirect command 1420 to client device 110. Redirect command 1420 may instruct client device 110 to reconnect and retry request 1410. Client device 110 may receive redirect command 1420, may retry request 1410 (e.g., as new request 1430 to initiate a TCP connection with cache server 120), and may provide new request 1430 to cache hit/miss module 1310. New request 1430 may include an address of cache server 120, whereas request 1410 may not include the address of cache server 120. Based on the address of cache server 120, cache hit/miss module 1310 may forward new request 1430 to cache server 120. Cache server 120 may receive new request 1430, may retrieve resource 1440 requested by new request 1430, and may provide resource 1440 to network device 170. Network device 170 may forward resource 1440 to client device 110.

Returning to FIG. 15, when the requested resource is not cached (block 1520—CACHE MISS), process 1500 may include creating, via the cache hit/miss module, a firewall filter and providing a command instructing the client device to request the resource from an origin device (block 1560); receiving, via the firewall filter and from the client device, a new request for the resource based on the command (block 1570); enabling, via the firewall filter, the client device to receive the requested resource from the origin device based on the new request (block 1580); and removing the firewall filter after the client device receives the requested resource (block 1590).

For example, in an implementation described above in connection with FIG. 13, if cache hit/miss module 1310 determines that the resource requested by request 1320 is not cached (e.g., a cache miss) in cache server 120, cache hit/miss module 1310 may establish temporary firewall filter 1330 in network device 170. After, before, or while establishing firewall filter 1330, cache hit/miss module 1310 may generate redirect command 1340, and may provide redirect command 1340 to client device 110. Redirect command 1340 may instruct client device 110 to reconnect and retry request 1320. Client device 110 may receive redirect command 1340, may retry request 1320 (e.g., as new request 1360 to initiate a TCP connection with origin device 130), and may provide new request 1360 to firewall filter 1330 of network device 170. Firewall filter 1330 may receive new request 1360, and may forward new request 1360 to origin device 130. Origin device 130 may receive new request 1360, may retrieve a resource 1370 requested by new request 1360, and may provide resource 1370 to network device 170. Network device 170 may forward resource 1370 to client device 110. After client device 110 receives resource 1370, cache hit/miss module 1310 may remove firewall filter 1330 (e.g., from the firewall associated with network device 170), as indicated by reference number 1390, so that any new requests from client device 110 may go through cache hit/miss module 1310 again.

Systems and/or methods described herein may provide a modular transparent proxy cache scheme that separates cache hits and cache misses, where a cache hit may refer to when a requested resource is stored in a proxy cache, such as a cache server, and a cache miss may refer to when a requested resource is not stored in the cache server. The systems and/or methods may enable cache hit traffic to be served by the cache server using an IP address of an origin device storing a resource, and may enable cache miss traffic to flow between a client device (e.g. requesting a resource) and the origin device without any Layer 7 intercept. The cache server may asynchronously retrieve and store resources, such as content, services, etc., using a set of configured IP addresses associated with origin devices. In one example, when a cache miss occurs, the systems and/or methods may cause a redirect command to be provided back to a client device requesting a resource. In response to the redirect command, the client device may generate a new resource request that may be provided to an origin device without intervention of the cache server.

The term component, as used herein, is intended to be broadly construed to include hardware (e.g., a processor, a microprocessor, an ASIC, a FPGA, a chip, a memory device (e.g., a ROM, a RAM, etc.), etc.) or a combination of hardware and software (e.g., a processor, microprocessor, ASIC, etc. executing software contained in a memory device).

The term packet, as used herein, is intended to be broadly construed to include a frame, a datagram, a packet, or a cell; a fragment of a frame, a fragment of a datagram, a fragment of a packet, or a fragment of a cell; or another type, arrangement, or packaging of data.

The foregoing description of implementations provides illustration and description, but is not intended to be exhaustive or to limit the invention to the precise form disclosed.

Modifications and variations are possible in light of the above teachings or may be acquired from practice of the invention.

For example, while series of blocks have been described with regard to FIGS. 9-12B and 15, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by a computing device, the method comprising:
    receiving, by the computing device and from a client device, a request for a resource that is available from an origin device;
    creating, by the computing device, an intercept list that includes entries for addresses of traffic to be routed to a cache server;
    creating, by the computing device, an exception list that includes entries for N-tuples (N≧2) of packets to be routed to the origin device,
        each of the entries of the exception list matching an entry provided in the intercept list,
    determining whether the resource is likely cached in the cache server or not likely cached in the cache server,
        determining whether the resource is likely cached in the cache server or not likely cached in the cache server including:
        determining that the resource is likely cached in the cache server when a destination Internet protocol (IP) address of the request is provided in the intercept list and not provided in the exception list, and
        determining that the resource is not likely cached in the cache server when the destination IP address of the request is not provided in the intercept list or is provided in the exception list; and
    forwarding, by the computing device, the request to the cache server,
        when the resource is likely cached in the cache server, the cache server retrieving a cached resource based on the request and forwarding the cached resource to the client device, or
        when the resource is not likely cached in the cache server, the cache server forwarding a redirect command to the client device, based on the request, and the client device obtaining the resource from the origin device based on the redirect command.

2. The method of claim 1, where the redirect command includes a command with a hypertext transfer protocol (HTTP) 302 response status code.

3. The method of claim 1, where the resource comprises one or more of audio data, video data, text, or a service.

4. The method of claim 1, further comprising:
    creating a watch list that includes entries for addresses associated with origin devices;
    receiving a plurality of requests for resources from the client device;
    filtering the plurality of requests based on the watch list; and
    reporting the filtered plurality of requests to the cache server.

5. The method of claim 4, further comprising:
    analyzing cache hit ratios for the addresses associated with the entries in the watch list; and
    adding a particular address to the intercept list when a cache hit ratio of the particular address exceeds a threshold.

6. The method of claim 1, further comprising:
    removing a particular entry from the exception list based on a timeout value or when a connection, associated with the particular entry, is closed.

7. The method of claim 1, further comprising:
    receiving traffic provided from a plurality of origin devices to the client device;
    determining whether the traffic includes resources to cache in the cache server;
    providing, to the cache server, addresses of the plurality of origin devices determined to include cacheable resources; and
    generating, based on the whether the traffic includes resources to cache in the cache server, a report of potential bandwidth savings associated with the cache server or a report associated with traffic distribution.

8. The method of claim 7, where determining whether the traffic includes resources to cache in the cache server is based on configurable parameters that include one or more of:
    a size associated with one of the resources,
    a cache expiry time associated with the cache server, or
    a total cacheable bandwidth associated with the cache server.

9. The method of claim 1, where the cache server, when the resource is not likely cached in the cache server:
    adds the resource as a particular candidate resource to store,
    retrieves the particular candidate resource from one or more of the origin devices, and
    stores the particular candidate resource.

10. A computing device comprising:
    a memory to store information regarding resources stored in a cache server; and
    a processor to:
        receive, from a client device, a request for a resource that is available from an origin device,
        store, in the memory, an intercept list that includes entries for addresses of traffic to be routed to the cache server,
        store, in the memory, an exception list that includes entries for N-tuples (N≧2) of packets to be routed to the origin device, where each of the entries of the exception list matches an entry provided in the intercept list, determine, based on the information stored in the memory, whether the resource is likely cached in the cache server or not likely cached in the cache server, the processor, when determining whether the resource is likely cached in the cache server or not likely cached in the cache server, being further to:
  determine that the resource is likely cached in the cache server when a destination Internet protocol (IP) address of the request is provided in the intercept list and not provided in the exception list, and
  determine that the resource is not likely cached in the cache server when the destination IP address of the request is not provided in the intercept list or is provided in the exception list, and
forward the request to the cache server,
  when the resource is likely cached in the cache server, the cache server retrieving a cached resource based on the request and forwarding the cached resource to the client device, and
  when the resource is not likely cached in the cache server, the cache server forwarding a redirect command to the client device, based on the request, and the client device obtaining the resource from the origin device based on the redirect command.

11. The computing device of claim 10, where the processor is further to:
store, in the memory, a watch list that includes entries for addresses associated with origin devices,
receive a plurality of requests for resources from the client device,
filter the plurality of requests based on the watch list, and
report the filtered plurality of requests to the cache server.

12. The computing device of claim 11, where the processor is further to:
analyze cache hit ratios for the addresses associated with the entries in the watch list, and
add a particular address to the intercept list when a cache hit ratio of the particular address exceeds a threshold.

13. The computing device of claim 10, where the processor is further to:
remove a particular entry from the exception list when a connection, associated with the particular entry, is closed.

14. The computing device of claim 10, where the processor is further to:
receive traffic provided from a plurality of origin devices to the client device,
determine whether the traffic includes resources to cache in the cache server,
provide, to the cache server, addresses of the plurality of origin devices determined to include cacheable resources, and
generate, based on whether the traffic includes resources to cache in the cache server, a report of potential bandwidth savings associated with the cache server or a report associated with traffic distribution.

15. The computing device of claim 14, where the processor determines whether the traffic includes resources to cache in the cache server is based on configurable parameters that include one or more of:
a size associated with one of the resources,
a cache expiry time associated with the cache server, or
a total cacheable bandwidth associated with the cache server.

16. The computing device of claim 10, where the resource comprises one or more of audio data, video data, text, or a service.

17. The computing device of claim 10, where the redirect command includes a command with a hypertext transfer protocol (HTTP) response status code.

18. The computing device of claim 10, where, when the resource is not likely cached in the cache server, the cache server:
adds the resource as a particular candidate resource to store,
retrieves the particular candidate resource from one or more of the origin devices, and
stores the particular candidate resource.

19. A non-transitory computer-readable medium to store instructions, the instructions comprising:
one or more instructions that, when executed by at least one processor associated with a computing device, cause the at least one processor to:
  receive, from a client device, a request for a resource that is available from an origin device,
  store an intercept list that includes entries for addresses of traffic to be routed to a cache server,
  store an exception list that includes entries for N-tuples (N≧2) of packets to be routed to the origin device, where each of the entries of the exception list matches an entry provided in the intercept list,
  determine whether the resource is likely cached in the cache server or not likely cached in the cache server, the one or more instructions to determine whether the resource is likely cached in the cache server or not likely cached in the cache server further including:
    one or more instructions to:
      determine that the resource is likely cached in the cache server when a destination Internet protocol (IP) address of the request is provided in the intercept list and not provided in the exception list, and
      determine that the resource is not likely cached in the cache server when the destination IP address of the request is not provided in the intercept list or is provided in the exception list, and
  forward the request to the cache server,
    when the resource is likely cached in the cache server, the cache server retrieving a cached resource based on the request and forwarding the cached resource to the client device, and
    when the resource is not likely cached in the cache server, the cache server forwarding a redirect command to the client device, based on the request, and the client device obtaining the resource from the origin device based on the redirect command.

20. The non-transitory computer-readable medium of claim 19, where the instructions further comprise:
one or more instructions to:
  store a watch list that includes entries for addresses associated with origin devices, receive a plurality of requests for resources from the client device,
  filter the plurality of requests based on the watch list, and
  report the filtered plurality of requests to the cache server.

21. The non-transitory computer-readable medium of claim 19, where the instructions further comprise:
one or more instructions to:

remove a particular entry from the exception list when a connection, associated with the particular entry, is closed.

22. The non-transitory computer-readable medium of claim 19, where the instructions further comprise:
one or more instructions to:
receive traffic provided from a plurality of origin devices to the client device,
determine whether the traffic includes resources to cache in the cache server,
provide, to the cache server, addresses of the plurality of origin devices determined to include cacheable resources, and
generate, based on the whether the traffic includes resources to cache in the cache server, a report of potential bandwidth savings associated with the cache server or a report associated with traffic distribution.

23. The non-transitory computer-readable medium of claim 22, where the one or more instructions to determine whether the traffic includes resources to cache in the cache server include:
one or more instructions to evaluate configurable parameters that include one or more of:
a size associated with one of the resources,
a cache expiry time associated with the cache server, or
a total cacheable bandwidth associated with the cache server, and
one or more instructions to determine whether the traffic includes resources to cache in the cache server based on evaluating the configurable parameters.

24. The non-transitory computer-readable medium of claim 19, where the resource comprises one or more of audio data, video data, text, or a service.

25. The non-transitory computer-readable medium of claim 19, where the redirect command includes a command with a hypertext transfer protocol (HTTP) response status code.

* * * * *